United States Patent
Taniguchi et al.

(10) Patent No.: US 6,429,553 B1
(45) Date of Patent: Aug. 6, 2002

(54) MOTOR AND ELECTRIC POWER STEERING DEVICE

(75) Inventors: Yoshiaki Taniguchi, Saitama; Susumu Aoki; Wataru Mochizuki, both of Kiryu; Hideyuki Ogawa, Tatebayashi, all of (JP)

(73) Assignee: Mitsuba Corporation, Gunma (JP)

(*) Notice: Subject to any disclaimer, the term of this patent is extended or adjusted under 35 U.S.C. 154(b) by 0 days.

(21) Appl. No.: 09/509,719

(22) PCT Filed: Aug. 6, 1999

(86) PCT No.: PCT/JP99/04270
§ 371 (c)(1),
(2), (4) Date: Mar. 31, 2000

(87) PCT Pub. No.: WO00/07865
PCT Pub. Date: Feb. 17, 2000

(30) Foreign Application Priority Data

Aug. 7, 1998 (JP) .......... 10-224522
Sep. 1, 1998 (JP) .......... 10-247060
Sep. 1, 1998 (JP) .......... 10-247061

(51) Int. Cl.[7] ................................ H02K 7/00
(52) U.S. Cl. .................. 310/67 R; 310/71; 310/75 R; 180/400
(58) Field of Search .................. 180/400, 413, 180/414, 415, 421, 422, 443, 444, 446, 428; 310/67 R, 71, 64, 75 R, 98, 89

(56) References Cited

U.S. PATENT DOCUMENTS 5,437,349 A * 8/1995 Kurahashi et al. .......... 180/79.1
5,573,079 A * 11/1996 Suda et al. .......... 180/444
5,685,390 A * 11/1997 Chikuma et al. .......... 180/444
5,732,790 A * 3/1998 Endo et al. .......... 180/444

FOREIGN PATENT DOCUMENTS

JP          63-15271       2/1988
JP          63-112176      7/1988
JP          01090872 A     4/1989

* cited by examiner

Primary Examiner—Burton S. Mullins
Assistant Examiner—Thanh Lam
(74) Attorney, Agent, or Firm—McCormick, Paulding & Huber LLP

(57) ABSTRACT

In an electric motor comprising a cylindrical yoke having a side wall at one end portion thereof, a driver unit for controlling and driving the electric motor is contained at an end portion in the side of the side wall in the yoke. A power supply opening portion through which inside and outside of the yoke communicate with each other and a signal line opening portion are formed in the side wall, and an electric connection to the driver unit is made through these portions. The driver unit is provided inside the yoke with FETs thereof kept in direct contact with the side wall. Also, a driver unit which integrates drive control circuitry with a brush holder may be provided and fixed on the outer surface of the side wall. In this case, an opening portion through which inside and outside of the yoke communicate with each other is formed in the side wall, and a brush is inserted through these portions. A driver unit is attached to a yoke with FETs thereof kept in direct contact with the side wall. As a result, in an electric motor having a power supply section provided deep in the yoke closed at its one end, the control drive section and the apparatus body can be integrally provided with each other without hindering the assembling operation.

12 Claims, 17 Drawing Sheets

MOTOR AND ELECTRIC POWER STEERING DEVICE

BACKGROUND OF THE INVENTION

The present invention relates to an electric motor having a control drive means and particularly to a technique effectively applied to an electric power steering apparatus for vehicles. And, the present invention, in particular, relates to a technique effectively applied to an electric power steering apparatus used in a rack-and-pinion type steering apparatus.

To assist steering torque of a vehicle, so-called power steering apparatuses are used in many vehicles in recent years, and various power steering apparatuses, such as a hydraulic type, an electric type, and the like have been proposed. Of these power steering apparatuses, a known electric power steering apparatus applied to a rack-and-pinion type of steering apparatus will be one called a rack assist type which obtains a steering assist force by an electric motor provided coaxially on the rack shaft. This type uses an electric motor, which incorporates a field magnetic device, an armature, and the like in a cylindrical yoke, and the steering torque is assisted by this electric motor.

FIG. 19 is a view which explains an example of the rack assist type of power steering apparatus using this kind of electric motor. In the electric type of power steering apparatus shown in FIG. 19, an electric motor 52 is provided to be coaxial relative to the rack shaft 51 and steering assist force generated by the electric motor 52 is transmitted to the rack shaft 51 through a ball screw mechanism 53. Further, the steering wheel is rotated by the steering assist force together with a manual handling force, thereby reducing steering burdens of a driver.

The rack shaft 51 is connected with steering wheels by tie rods, knuckle arms, and the like provided at both ends thereof. The rack shaft 51 is connected by a rack-and-pinion manner to a steering shaft 54 connected to a steering handle or the like and reciprocates in left and right direction in FIG. 19 by steering of the driver. The electric motor 52 is constructed such that a cylindrical armature shaft 56 and a field magnetic device 57 are coaxially inserted in a cylindrical yoke 55, and an electric power is supplied from a power supply section 58. The field magnetic device 57 comprises a magnetic 59 attached on the inner circumferential portion of the yoke 55 and an armature core 60 attached on the outer circumferential portion of the armature shaft 56. The turning force generated by the electric motor 52 is transmitted as reciprocal motion in the axial direction to the rack shaft 51 through a ball screw mechanism 53 provided at the left end of the armature shaft 56 in FIG. 19, and thus, the steering force is assisted.

The power supply section 58 is provided with a brush 61 and a commutator 62 which makes slidable contact with the brush, and the electric power is supplied to the armature portion of the electric motor 52 through these components. The brush 61 is contained and held in a brush holder 63 and is pressed against the commutator with a predetermined pressure by a spring member not shown. A terminal plate 65 is welded to an end of a pigtail 64 of the brush 61. The terminal plate 65 penetrates the housing 66 and projects to the outside. A coupler 67 is attached to the projected terminal plate 65. Thus, the terminal for power supply is formed.

Meanwhile, there has been a proposed apparatus for incorporating control elements such as FETs and the like in the power supply section and for forming integrally a power steering apparatus and a control device section thereof. For example, in Japanese Patent Application Laid Open No. 6-255504, a power steering apparatus is described. In this apparatus, a hollow chamber is formed at the connecting portion where a housing containing a brushless motor and a housing holding a handle shaft are connected with each other, and a power circuit unit which contains FETs and circuit boards in the hollow chamber is provided. Further, Japanese Patent Application Laid-Open No. 8-26125 describes a power steering apparatus in which FETs and boards are contained in a gear box housing where a steering shaft is held and connected with a motor yoke.

In the electronic motor used in the apparatus shown in FIG. 19 or the above example, the power supply section thereof is provided at the connecting portion where an opening edge side of the yoke, the housing (or yoke) of the electric motor side, and the housing of the steering shaft side are connected to each other. It is therefore possible to incorporate relatively easily a brush, a control circuit, and the like in the vicinity of the opening edge of the yoke or a dividing surface. Even in this kind of power steering apparatus using an electric motor, the control circuit or the like can be incorporated so as to be inserted in the vicinity of the dividing surface. Therefore, integration of the apparatus body with the control drive section can be achieved with ease, and there is no problem caused in assembling operation.

However, in an electric motor which uses a cylindrical yoke provided with a side wall at one end thereof and is provided with a power supply section in the side wall side, the power supply section is not situated at the opening portion. Therefore, the control drive section cannot be simply integrated like the above example. That is, if a control drive section is integrally incorporated into this kind of electric motor, various components must be assembled deep into the yoke from the opening side thereof. This results in a drawback in assembling operation.

Also, there is such a type of a power steering apparatus that the housing and yoke in the steering shaft side are formed integrally, a power supply section, an armature, a field magnetic device, and the like are assembled therein, and these components are coupled with another housing containing a ball screw mechanism. The power supply section cannot be situated near a driving portion therebetween. Therefore, the control drive section cannot be integrated easily like the above example. In this type of power steering apparatus, an end side of the yoke of the housing in the steering shaft side is formed in a cylindrical shape which is closed except a rack shaft insertion portion, and the power supply section is provided at a deepest portion of a closed end. Consequently, also in this kind of power steering apparatus, if the control drive section is integrally incorporated, various components must be assembled deep in the housing. So, there are difficulties in assembling operation. Therefore, it is not possible to easily adopt a structure that a space for a control section is formed at a part of the housing like the foregoing example and control elements and boards are assembled in the space. Improvement has hence been demanded in this respect.

The present invention therefore has an object of integrally providing a control drive section with the apparatus body in this kind of electric motor without reducing efficiency of the assembling operation. Also, another object of the present invention is to integrally provide a control drive section of an electric power steering apparatus with the apparatus body without reducing efficiency of the assembling operation.

The above and other related objects and novelty features of the invention will be apparent from reading of the following specification and the accompanying drawings.

SUMMARY OF THE INVENTION

An electric motor according to the present invention comprises a cylindrical housing having a side wall at one end portion thereof and is characterized in that a control drive means for controlling and driving the electric motor is provided at an end portion in a side of the side wall inside the housing or on an outer surface of the side wall. As a result of this, even in an electric motor having an electric motor which is provided deep in the housing, the control drive means can be integrally provided with the electric motor without hindering the assembling operation.

In this case, the control drive means may be contained at the end portion in the side of the side wall inside the housing, the side wall may have an opening portion for communicating with inside and outside of the housing, and the control drive means may be electrically connected with the outside of the housing through the opening portion. Further, the control drive means may be provided inside the housing so as to directly contact to the side wall, and thereby heat generated from the control drive means can thereby be efficiently radiated through the housing. The contact between the control drive means and the side wall conceptually includes a modification that not only the surface of the casing in the control drive means but also exposed control drive elements, circuit elements and the like are kept in contact with the side wall. Note that presence or absence of a brush is not asked.

Also, in case where an electric power is supplied with an electric motor by a brush, a brush holder for containing the brush and control drive means for controlling and driving the electric motor may be integrally formed. At this time, a unit which integrates the brush holder and the control drive means can be applied to the electric motor having a cylindrical housing with a side wall at one end portion as described above. Note that in this electric motor, the slidable direction of the brush may be the axial direction or radial direction.

Further, in case where the electric motor has a cylindrical yoke with a side wall at one end portion thereof and an electric power is supplied with the electric motor by a brush, a brush holder for containing the brush and the control drive means for controlling and driving the electric motor may be integrated, thereby forming a drive control unit, and the drive control unit may be provided on an outer surface of a side wall of the yoke. As a result of this, even in an electric motor having an electric power supply section which is provided deep in the housing, the control drive means can be integrally provided with the electric motor without hindering the assembling operation.

At this time, an opening portion may be formed in the side wall so as to communicate with inside and outside of the yoke, and the brush may be inserted into the yoke through the opening portion. Also, the drive control unit may be provided outside the yoke so as to directly contact to the side wall. As a result of this, heat generated from the control drive unit can be efficiently radiated through the yoke. Note that the contact between the control drive means and the side wall conceptually includes a modification form that not only the surface of the casing in the control drive means but also exposed control drive means such as FETs, ECUs and the like are kept in contact with the side wall.

Meanwhile, an electric power steering apparatus according to the present invention comprises: a rack shaft connected to steering wheels; a first housing for containing movably the rack shaft and for holding a connecting portion where rack teeth formed on the rack shaft are engaged with a pinion of a steering shaft connected to a steering handle; an electric motor located coaxially around the rack shaft in the first housing, and supplying steering assist force with the rack shaft; a ball screw mechanism for connecting a nut portion connected with a rotor shaft of the electric motor and a screw portion formed on the rack shaft, with each other with a ball member inserted therebetween, and for transmitting rotatory power of the electric motor as steering assist force to the rack shaft; and a second housing containing the ball screw mechanism and connected with the first housing, the power supply section of the electric motor being provided at the first housing in an opposite side of the second housing relative to an axial direction, and is characterized in that a control drive means for controlling and driving the electric motor is provided at a position adjacent to the power supply section of the first housing.

As a result of this, even in a type of electric power steering apparatus with which an electric power supply section is provided deep in the first housing, the control drive means can be provided integrally in first housing without hindering the assembling operation. In this case, the control drive means may be contained at a position adjacent to the power supply section in the first housing.

In addition, an opening portion through which inside and outside of the first housing communicate with each other may be formed so as to face a located position of the control means, and the control drive means and the outside of the first housing may be electrically connected to each other through the opening portion. Also, the control drive means may be contained inside the first housing so as to directly contact to a side wall of the first housing.

Further, in the electric power steering apparatus according to the present invention, a brush holder for containing a brush of the electric motor and a control drive means for controlling and driving the electric motor may be integrated, thereby forming a drive control unit, and the drive control unit may be provided at such a portion as to face the power supply section outside the first housing.

As a result of this, even in a type of electric power steering apparatus with which an electric power supply section is provided deep in the first housing, the control drive means can be integrally provided with first housing without hindering the assembling operation. At this time, an opening portion through which inside and outside of the first housing communicate with each other may be formed, and the brush may be inserted into the first housing through the opening portion. Also, the drive control unit may be provided outside the yoke with the drive control unit (or control drive means such as FETs and ECUs and the like contained therein) kept in direct contact with the first housing.

At this time, an opening portion through which inside and outside of the first housing communicate with each other may be formed, and a brush may be inserted through the opening portion. Also, the control unit may be provided outside the first housing with the control drive unit kept in direct contact with the first housing.

In addition, another electric power steering apparatus according to the present invention comprises: a rack shaft connected to steering wheels; a first housing for containing movably the rack shaft and for holding a connecting portion where rack teeth formed on the rack shaft are engaged with a pinion of a steering shaft connected to a steering handle; an electric motor located coaxially around the rack shaft in the first housing, and supplying a steering assist force with the rack shaft; a ball screw mechanism for connecting a nut portion connected with a rotor shaft of the electric motor and a screw portion formed on the rack shaft, with each other with a ball member inserted therebetween, and transmitting rotatory power of the electric motor as steering assist force to the rack shaft; and a second housing containing the ball screw mechanism, and is characterized in that the first housing has a power supply opening which is formed at such a portion as to face a power supply section of the electric motor and to communicate with inside and outside of the first housing through the power supply opening portion, and a control drive means for controlling and driving the electric motor is integrally provided with the first housing outside the first housing, and is electrically connected to the power supply section through the power supply opening portion.

As a result of this, even in a type of electric power steering apparatus with which an electric power supply section is provided deep in the first housing, the control drive means can be integrally provided with the first housing without hindering the assembling operation. Also, since the control drive means is provided outside the housing apart from the power supply section, the control drive means does not receive harmful influences from dust caused by abrasion of the brush.

In this case, a second opening portion, through which a slidable contact portion between a commutator of the electric motor and a brush can be observed may be formed at such a portion as to face the power supply section of the electric motor. As a result of this, a state of slidable contact between a brash of the power supply portion and a commutator can be easily observed.

Also, the control drive means may be provided with a terminal plate which is inserted in the first housing through a power supply opening portion and can be observed through a second opening portion, and the terminal plate may be welded through the second opening portion to a contact plate electrically connected to a brush of the electric motor.

Further, the control drive means may be constructed from providing an element for controlling and driving the electric motor on a heat radiation plate made of metal, and the control drive means may be attached onto the first housing with the heat radiation plate kept in direct contact with the first housing. As a result of this, it is possible to improve the heat radiation characteristic of the control drive mean.

DESCRIPTION OF THE PREFERRED EMBODIMENT

In the following, embodiments of the present invention will be explained in details with reference to the drawings.

Embodiment 1

Figure 1:
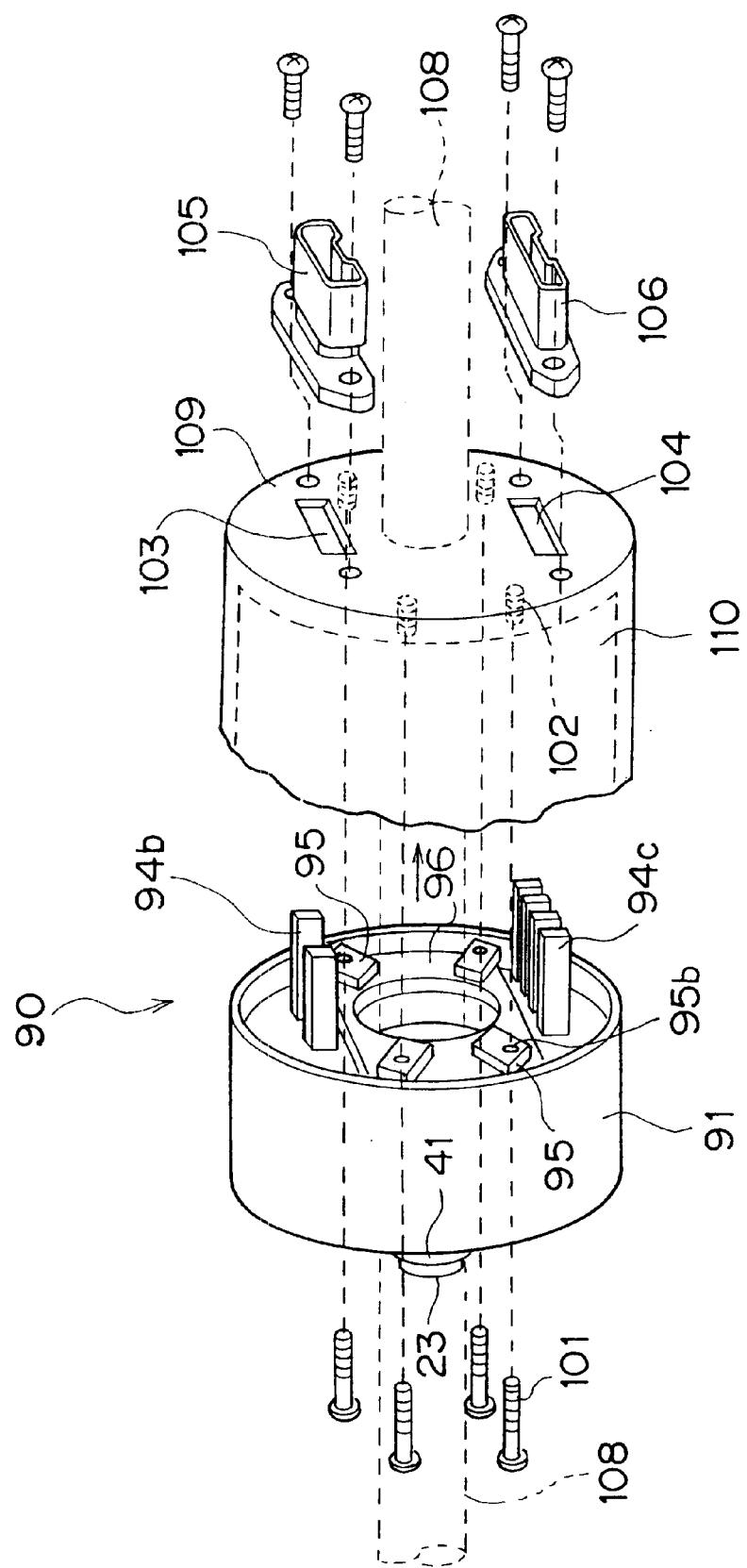
FIG. 1 is an explanatory view illustrating the structure of an electric motor which is the embodiment 1 of the present invention.
Figure 2:
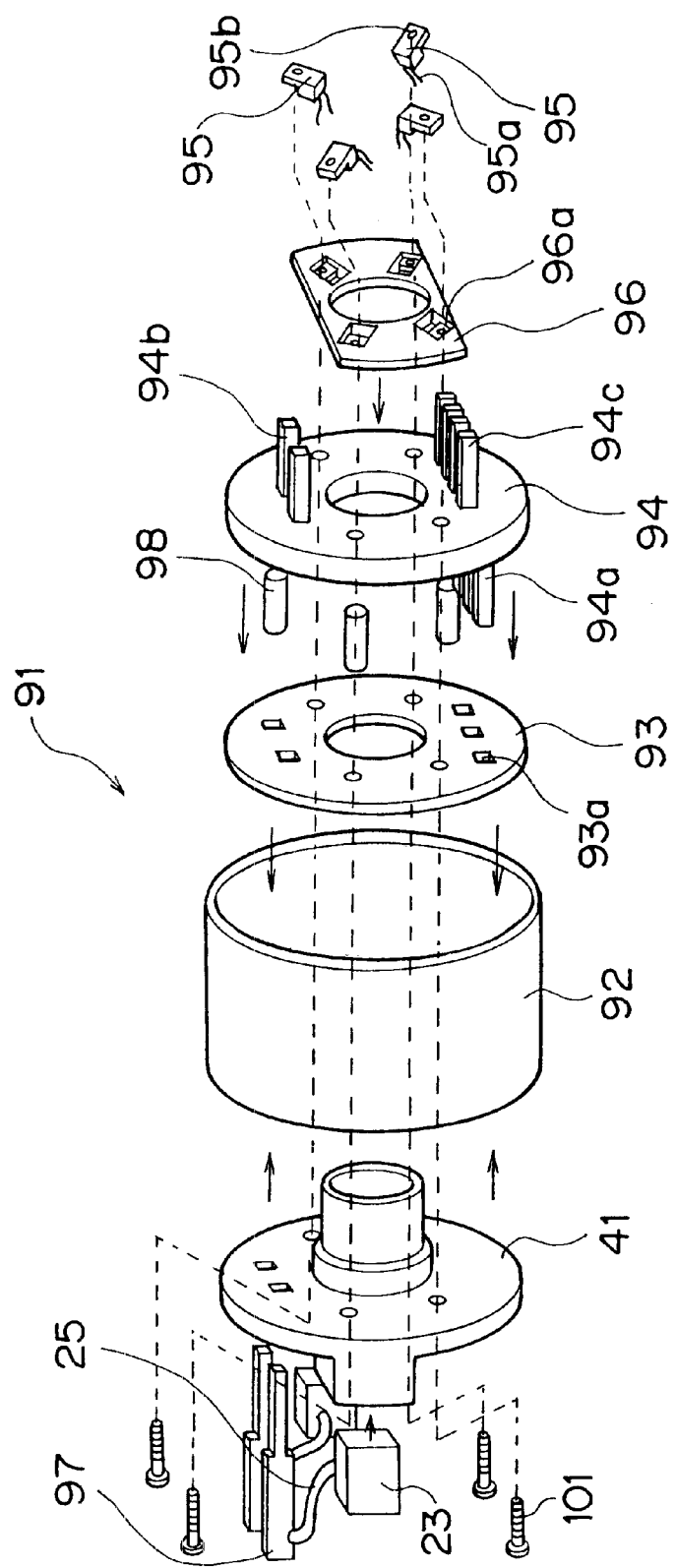
FIG. 2 is an exploded perspective view showing the structure of a driver unit.
Figure 3:
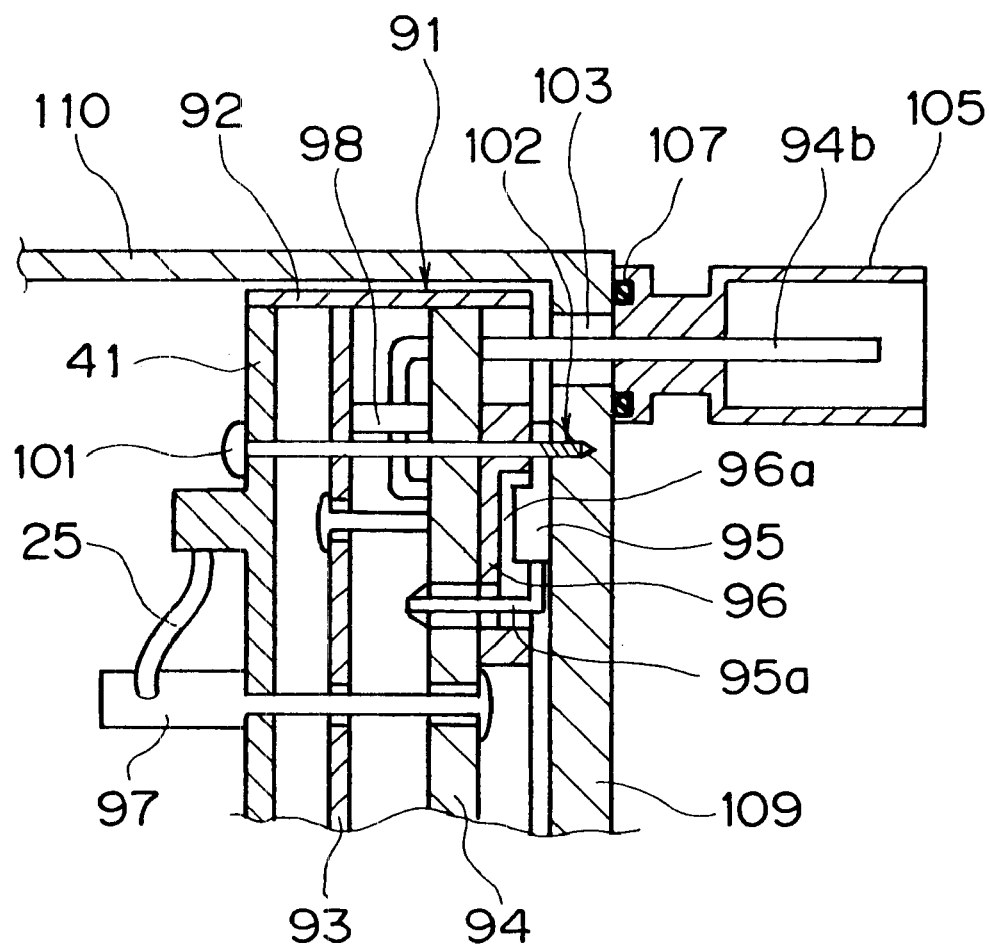
FIG. 3 is a cross-sectional view showing a state where a driver unit is attached in a yoke.

FIG. 1 is a view explaining the structure of an electric motor which is the Embodiment 1 of the present invention. An electric motor 90 according to the present invention, is constructed from assembling control elements such as FETs and ECUs and various circuit elements as a unit, forming a driver unit (control drive means) 91, containing and arranging the driver unit 91 inside a yoke 110. FIG. 2 is an exploded perspective view showing the structure of the driver unit 91, and FIG. 3 is a cross-sectional view showing a state where the driver unit 91 is installed in the yoke 110.

As shown in FIG. 2, the driver unit 91 is constructed from integrally containing in a case 92, a brush holder 41, a print wire board (hereinafter abbreviated as PWB) 93, an insert wiring board (hereinafter abbreviated as IWB) 94, an FET 95 as a control drive element, and an FET press board 96. In other words, the driver unit 91 as a control system is integrally arranged at a portion of the brush holder 41. So, wiring between a control device and the electric motor can be omitted and noise reduction and improvement in system efficiency can be accomplished.

However, the driver unit 91 need not always be integrated with the brush holder 41. That is, although the driver unit 91 of the embodiment 1 includes the brush holder 41, the control drive means defined by the present invention may include a form which does not include the brush holder. Therefore, for example, a structure excluding a part of the brush holder will be used in case of a brushless motor and will serve as a control drive means.

Note that numeral 108 shown broken lines in FIG. 1 denotes a drive shaft of the electric motor 90, and the other portions of the electric motor 90 than the driver unit 91 are constructed from the same structure as that of a conventional electric motor. Therefore, explanation thereof will be omitted herefrom and also from the following embodiment concerning the electric motor.

The brush holder 41 contains a brush 23 which is connected with a terminal 97 through a pigtail 25. The terminal 97 has an end portion welded to the IWB 94. The brush 23 and the IWB 94 are connected with each other through the terminal 97. The PWB 93 equips circuit elements such as resistors and the like. Further, connection terminals 94a of the IWB 94 are inserted in connection holes 93a of the PWB 93 and soldered at the PWB 93. Thus, the PWB 93 and the IWB 94 are electrically connected with each other and are both assembled. Note that spacers 98 are provided between the PWB 93 and IWB 94.

In the right side of the IWB 94 in FIG. 2, the FET press plate 96 made of aluminum is attached. The FET press plate 96 has four FET container portions 96a, to which FETs 95 are attached respectively. The FET 95 is attached such that one surface thereof is exposed from an end surface of the driver unit 91 and somehow projected from the end surface. As shown in FIG. 3, a terminal 95a of the FET 95 is led from the FET container portion 96a to the IWB 94 side and is extended to a back surface side of the IWB 94, thereafter being soldered. The IWB 94 has a power supply terminal 94b for power supply and a signal terminal 94c for transmitting/receiving control signals.

After the brush holder 41, PWB 93, IWB 94, FETs 95, and FET press plate 96 are contained in the case 92, synthetic resin is filled inside the case 92 to achieve potting. In this manner, the durability of the driver unit 91 is guaranteed. For example, the driver unit 91 can be protected against impacts caused by stepping stones and the like even when the electric motor 90 is used in a power steering apparatus located near a vehicle-driving surface.

The above-mentioned driver unit 91 is contained and held inside an end portion of the yoke 110 as shown in FIGS. 1 and 3. An end side of the yoke 110 is closed by a side wall 109, and the driver unit 91 is attached such that the exposed surface of the FET 95 contacts with an inner surface of the side wall 109. The driver unit 91 is fixed by screws 101 through installation holes 95b of the FETs 95. As shown in FIG. 2, the brush holder 41, PWB 93, IWB 94, and FET press plate 96 have insertion holes at positions respectively corresponding to the installation holes 95b. The screws 101 are screwed into female screw holes 102 provided in the side wall 109 through those insertion holes. That is, the driver unit 91 is fixed to the side wall 109 together with the FETs 95. As shown in FIG. 3, a clearance space is provided in a back surface side of the FET 95 so that the FETs 95 may not float up from the side wall 109 due to unevenness of sizes.

Thus, in the electric motor 90, the FETs 95 are attached to the driver unit 91 so as to be put between the aluminum-made FET press plate 96 and the side wall 109. Besides, each face of the FETs 95 is pressed into tight contact with the side wall 109 of the yoke 110. Accordingly, heat generated from the FETs 95 is radiated through the yoke 110 and the FET press plate 96 which have excellent thermal conductivity, so the heat radiation capability can be ensured in the driver unit 91.

Meanwhile, a power supply opening portion 103 and a signal line opening portion 104 are provided in the side wall 109 so as to correspond to power supply terminals 94b and signal terminals 94c. A power source coupler 105 and a signal line coupler 106 are fixed by screws outside the opening portions 103 and 104, respectively. Thus, in the electric motor 90, the driver unit 91 is contained inside a closed end surface like the side wall 109, and has opening portions in order to make electric connections. An O-ring 107 is inserted and fitted between the side wall 109 and each of the couplers 105 and 106 (although FIG. 3 shows only the O-ring for the power supply coupler 105). So, the power supply opening portion 103 and the signal line opening portion 104 are respectively sealed to be watertight. The couplers 105 and 106 may be male or female types.

Meanwhile, the electric motor 90 according to the present invention is assembled as follows. Firstly, the assembled driver unit 91 is inserted deep (in the side wall 109) through the opening portion in the left end not shown. The power supply terminals 94b are inserted into the power supply opening portion 103 and the signal terminals 94c into the signal line opening portion 104.

Next, the driver unit 91 is fixed by a screw 104. Since the exposed surface of the FET 95 somehow projects from an end surface of the case 92, a surface of the FET 95 abuts on an inner surface of the side wall 109 of the yoke 110, as shown in FIG. 3. Further, the FETs 95 are tightened together with the driver unit 91 by screws 101 and fixed in tight contact with the side wall 109.

Outside the side wall 109, the power supply terminals 94b and the signal terminals 94c project respectively from the power supply opening portion 103 and the signal line opening portion 104. The power supply coupler 105 and the signal line coupler 106 are secured to these opening portions 103 and 104 by screws with O-rings 107. Thus, in the electric motor 90, the brush holder 41 and the control drive system are united so that the structure including the power supply system and the signal system can be constructed only through operations of securing the driver unit 91 in the yoke 110 by screws and of securing couplers outside the yoke 110 by screws.

And, after an armature, a field magnetic device, and the like are inserted in the yoke 110, the electric motor 90 is completely constructed. Note that a so-called disk-type commutator is used in the electric motor 90 and the brush 23 slidably contacts a right end surface thereof from the axial direction. This is because since the electric motor 90 is constructed from assembling the brush 23 deep in the yoke 110, it is difficult to assemble a type of brush that contacts slidably from the radial direction.

Thus, in the electric motor 90 according to the present invention, the power supply section 13 can be assembled easily even if being not situated near an opening portion. So, the assembly operation can be greatly improved and limitations to assembly process are reduced to enhance the degree of freedom in design.

Embodiment 2

Figure 4:
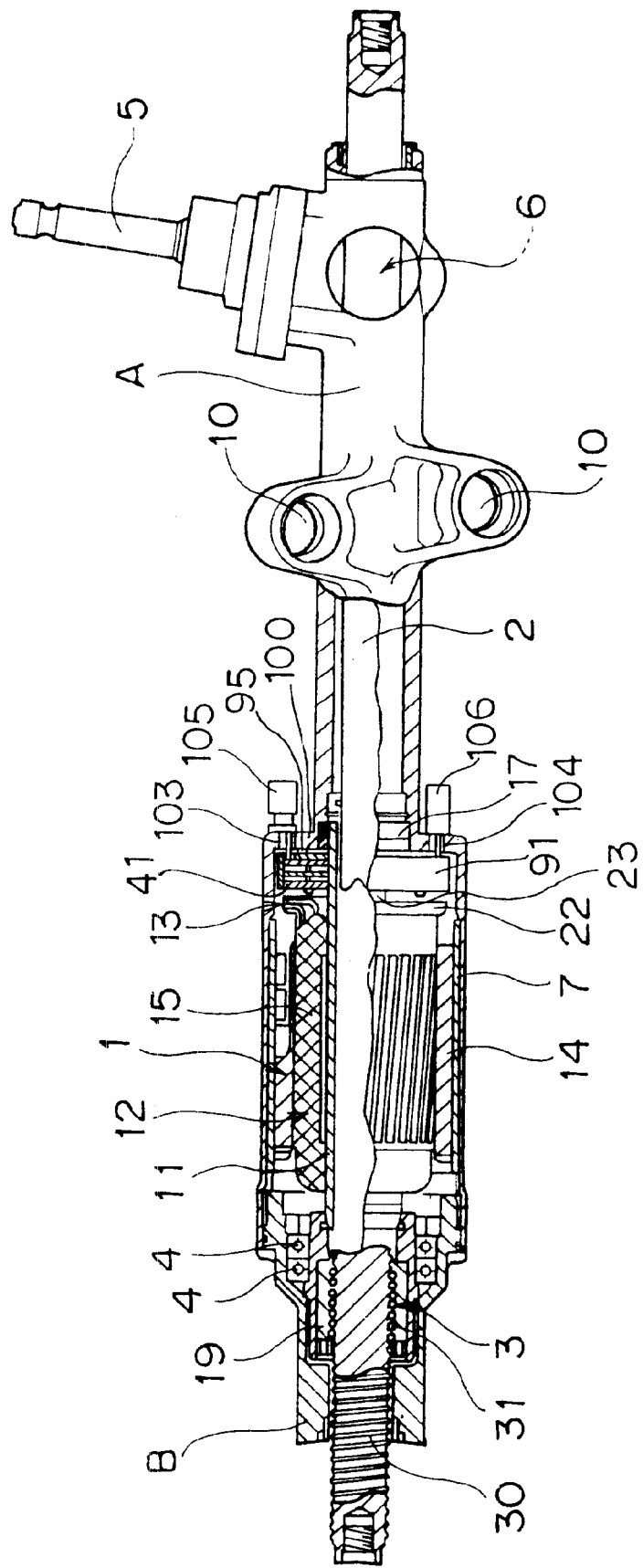
FIG. 4 is an explanatory view illustrating the entire structure of an electric power steering apparatus which is the embodiment 2 of the present invention, and including a partial section.

Next explanation will be made of an electric power steering apparatus using an electric motor as the embodiment 2 of the present invention. FIG. 4 is an explanatory view illustrating the entire structure of this electric power steering apparatus and including a partial section thereof. Note that the same members and components as those of the electric motor 90 according to the embodiment 1 will be denoted at the same reference symbols. and detailed explanation thereof will be omitted hereafter.

As shown in FIG. 4, the electric power steering apparatus (hereinafter abbreviated as a power steering apparatus) is constructed from providing a hollow electric motor 1 around a rack shaft 2 and, for example, is assembled as a steering apparatus for the steering wheel for front wheels of a vehicle. A steering assist force generated by the electric motor 1 is transmitted to the rack shaft 2 through a ball screw mechanism 3, thereby reducing driver's burdens to steering operation.

As shown in FIG. 4, the power steering apparatus is constructed from coupling a housing A (or first housing) and a housing B (or second housing) integrated with the yoke 7 of the electric motor 1. Inside the housings A and B, a rack shaft 2 is installed to be movable freely in the lateral direction. On condition that the electric motor 1 is attached to the vehicle body by a bracket not shown and installation holes 10 of the housing B, wheels are connected to both ends of the rack shaft 2 through tie rods and knuckle arms.

Meanwhile, the housing A is a hollow member made by aluminum die-casting. A cylindrical motor yoke (hereinafter abbreviated as a yoke) 7 is cast integrally into the housing A. Formed in a right end side of the housing A in FIG. 4 is a connecting portion 6 by which a steering shaft 5 connected to a steering handle not shown is connected with the rack shaft 2. At the connecting portion 6, a pinion not shown which is provided for the steering shaft 5 and rack teeth not shown which is formed in a side portion of the rack shaft 2 are engaged with each other. So, rotation of the steering shaft 5 is converted into motion of the rack shaft 2 in the lateral direction shown in the figure. A torque sensor not shown for detecting the rotation torque of the steering shaft 5 is provided on the axis of the connecting portion 6, and the steering assist force generated by the electric motor 1 is controlled according to the detection value thereof.

Next, the electric motor 1 is constructed from coaxially inserting a hollow cylindrical armature shaft 11 and a field magnetic device 12 in the cylindrical yoke 7. The rack shaft 2 is assembled inside the armature shaft 11 so as to penetrate therethrough. The field magnetic 12 comprises magnets 14 attached to the inner circumferential portion of the yoke 7 and an armature core 15 attached to the outer circumferential portion of the armature shaft 11. Electric power is supplied from the power supply section 13 to the armature core 15. The yoke 7 is a cylindrical member made of iron and is formed to have substantially constant thickness. The yoke 7 is cast in the housing A as described above.

In the power steering apparatus shown in FIG. 4, the yoke 7 is cast into the housing A, and the yoke 7 of the electric motor 1 itself does not have a side wall unlike the electric motor 90. However, when assembling the electric motor 1 is assembled, a side wall 100 of the housing A actually becomes an obstacle like a side wall provided in one end side of the yoke 7. Therefore, from the view point of improvements in the assembling operation, there is the same problem that of the electric motor 90 in the embodiment 1.

A plurality of magnets 14 as field magnetic poles forming part of the field magnetic device 12 are provided at an interval in circumferential direction inside the yoke 7. The armature shaft 11 is held in one end side thereof (a right end side shown in FIG. 4) by a bearing 17 attached to the housing A. A tapered spline is formed in an other end of the armature shaft 11 (a left end side shown in FIG. 4). The armature shaft 11 is pressured to the one end side (the left side shown in FIG. 4) by a snap member not shown and is engaged with a spline formed at an end portion of a nut portion 19 of the screw mechanism 3. In this manner, rotation of the armature shaft 11 is transmitted to the nut portion 19.

The power supply section 13 is a section for supplying electric power to the armature and includes a commutator 22 fitted at the armature shaft 11 and a brush 23 as an electric contact point which electrically contacts the commutator 22. In the power steering apparatus, a so-called disk-type commutator is used as the commutator 22 for the same reasons as described with respect to the previous electric motor 90. The brush 23 slidably contacts the right end surface of the commutator.

Figure 5:
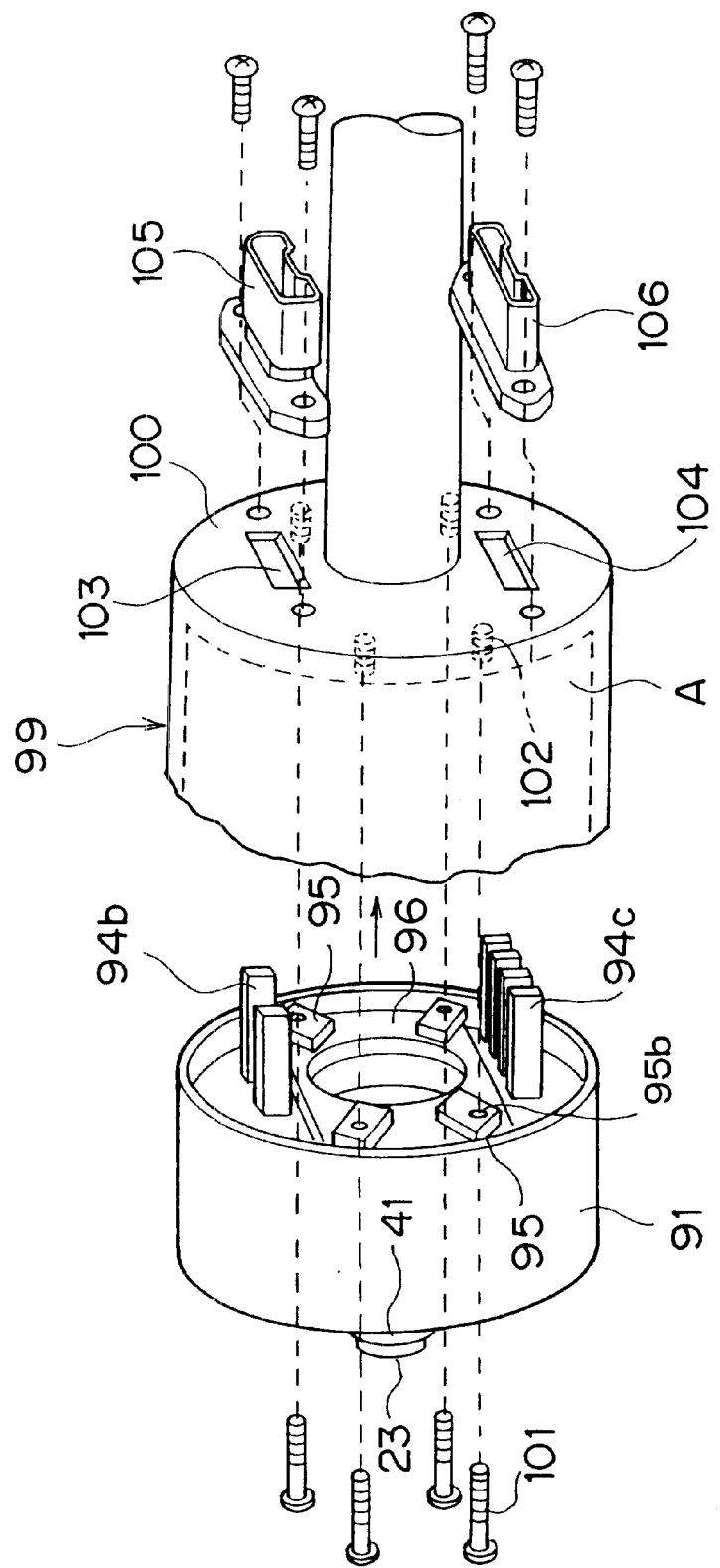
FIG. 5 is an explanatory view illustrating an installation state of a driver unit in the electric power steering apparatus of FIG. 4.

In the power steering apparatus according to the present invention, the driver unit (control drive means) 91 for controlling and driving the electric motor 1 is attached to be adjacent to the power supply section 13 in the form that it is contained inside the housing A. That is, the control drive means is integrated into a unit and contained in the power steering apparatus. FIG. 5 is a view explaining an installation state of the driver unit 91.

The driver unit 91 is formed in a structure similar to that shown in FIG. 2. The driver unit 91 is contained and provided in a large diameter portion 99 of the housing A as shown in FIG. 5. The driver unit 91 is inserted from an opening of a connecting portion to the housing B formed in the left side of the housing A in FIGS. 4 and 5. One end side of the large diameter portion 99 is closed by the side wall 100, and the driver unit 91 is attached such that the exposed surfaces of the FETs 95 contact the inner surface of the side wall 100. The driver unit 91 is fixed by screws 101 inserted into installation holes of the FETs 95. These statuses are the same as those shown in FIG. 3 except that the yoke 7 and the side wall 109 respectively correspond to the housing A and the side wall 100.

Accordingly, in the present power steering apparatus, the heat generated from the FETs 95 is rapidly radiated through the housing A and FET press plate 96 which have excellent heat conductivity like the electric motor 90 described previously. So, the heat radiation characteristic of the driver unit 91 is ensured. Also, since wiring between the control device and the electric motor in the embodiment 2 can be omitted for using the driver unit 91, noise reduction and efficient improvement in the system can be achieved.

Next, the housing B is a hollow member made by aluminum die-casting like the housing A and a ball screw mechanism 3 is incorporated therein. The ball screw mechanism 3 has a generally known structure which comprises a nut part 19, a screw part 30 formed on the outer circumference of the rack shaft 2, and a number of balls 31 inserted between the nut part 19 and the screw part 30. Since the rack shaft 2 is supported by the nut part 19 so as to reciprocate in the lateral direction, rotation about an axis thereof is limited. This results in movement of the rack shaft 2 in the lateral direction according as the nut part 19 rotates.

The nut part 19 is held to be rotatable about the axis in relation to the housing B by an angular bearing 4 fixed to the housing B. In the present power steering apparatus, after the nut part 19 of the ball screw mechanism 3, the rack shaft 2, and the angular bearing 4 are integrated with each other, these components are provided in the housing B formed independently of the housing A.

Meanwhile, the part of the housing A in the present power steering apparatus is assembled as follows. Like the electric motor 90 described previously, the assembled driver unit 91 is inserted deep in the large diameter portion 99 from the opening portion at the left end of the housing shown in FIG. 4. The power supply terminals 94b are inserted in the power supply opening portion 103, and the signal terminals 94c in the signal line opening portion 104. Next, the driver unit 91 is fixed by screws 101. The FETs 95 are also tightened together by the screws 101 and fixed in tight contact with the side wall 100. A power source coupler 105 and a signal line coupler 106 are screwed into opening portions 103 and 104 with O-rings 107 inserted therebetween. Thus, also in the present power steering apparatus, the power supply system and the signal system can be assembled by only work for screwing the driver unit 91 and the coupler.

Thereafter, an armature, a field magnetic device B, and the like are inserted in the yoke 110 and the assembly of the part of the electric motor 1 is completed. Note that the yoke 7 is cast in the housing A. Thus, in the present power steering apparatus, even if the power supply section 13 of the electric motor 1 is not situated near an opening portion, the section can be easily assembled. So, the assembling operation is greatly improved and limitations to assembling operation are eliminated. Accordingly, the degree of freedom can be enhanced in design.

The present power steering apparatus is operated in the following manner. Firstly, a steering handle is operated so that the steering shaft 5 rotates. The rack shaft 2 moves in the direction corresponding to the rotation thereof, and steering operation is carried out. Through this operation, a steering torque sensor not shown is activated, and then, a signal therefrom is transmitted to the driver unit 91. In response to the detected torque, the driver unit 91 supplies a power to the commutator 22 through the brush 23. Thus, the electric motor 1 is operated by this power so that the armature shaft 11 rotates. Accordingly, the nut part 19 combined with the shaft also rotates. As the nut part 19 rotates, the ball screw mechanism 3 is operated so as to transmit steering assist force to the rack shaft 2, thereby promoting the movement of the rack shaft 2. So, the steering force is thus assisted.

Embodiment 3

Figure 6:
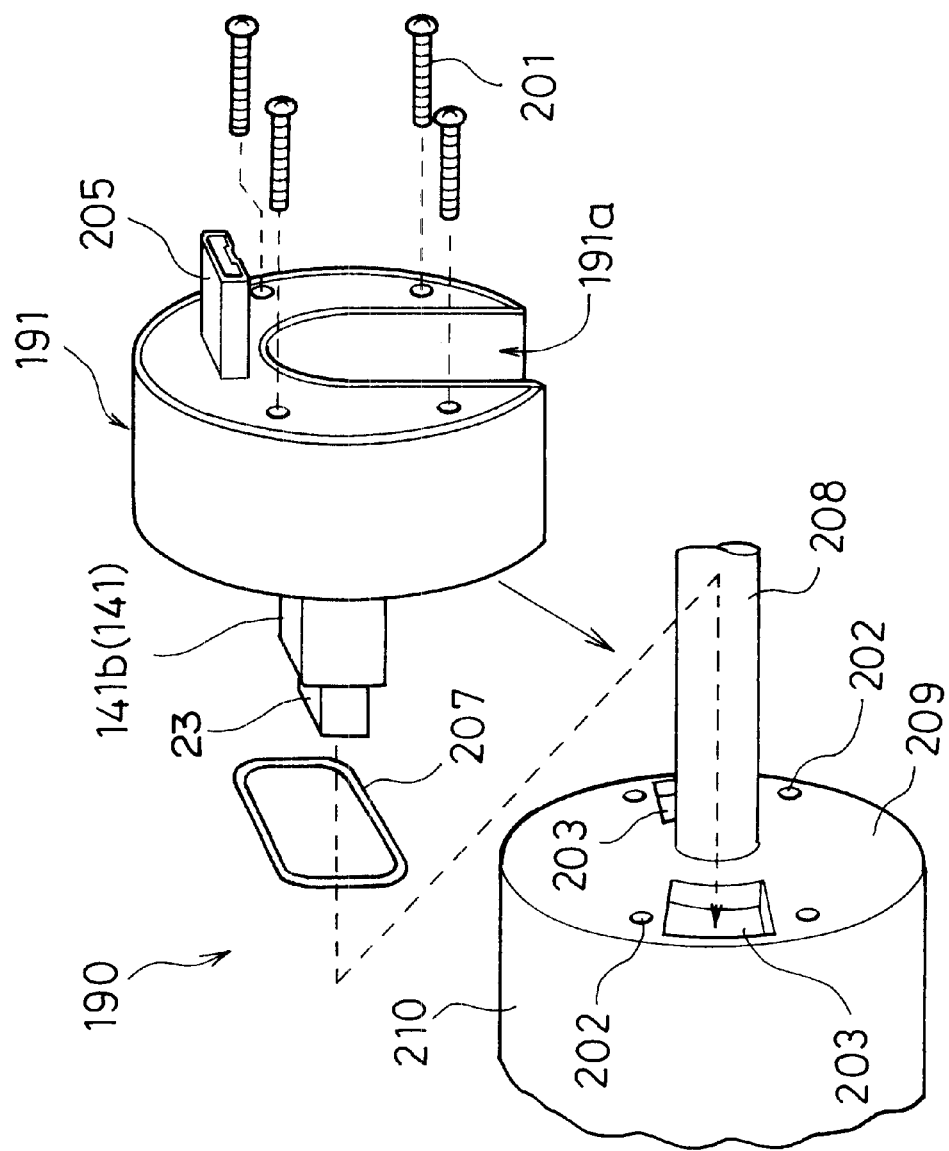
FIG. 6 is an explanatory view illustrating the structure of an electric motor which is the embodiment 3 of the present invention.
Figure 7:
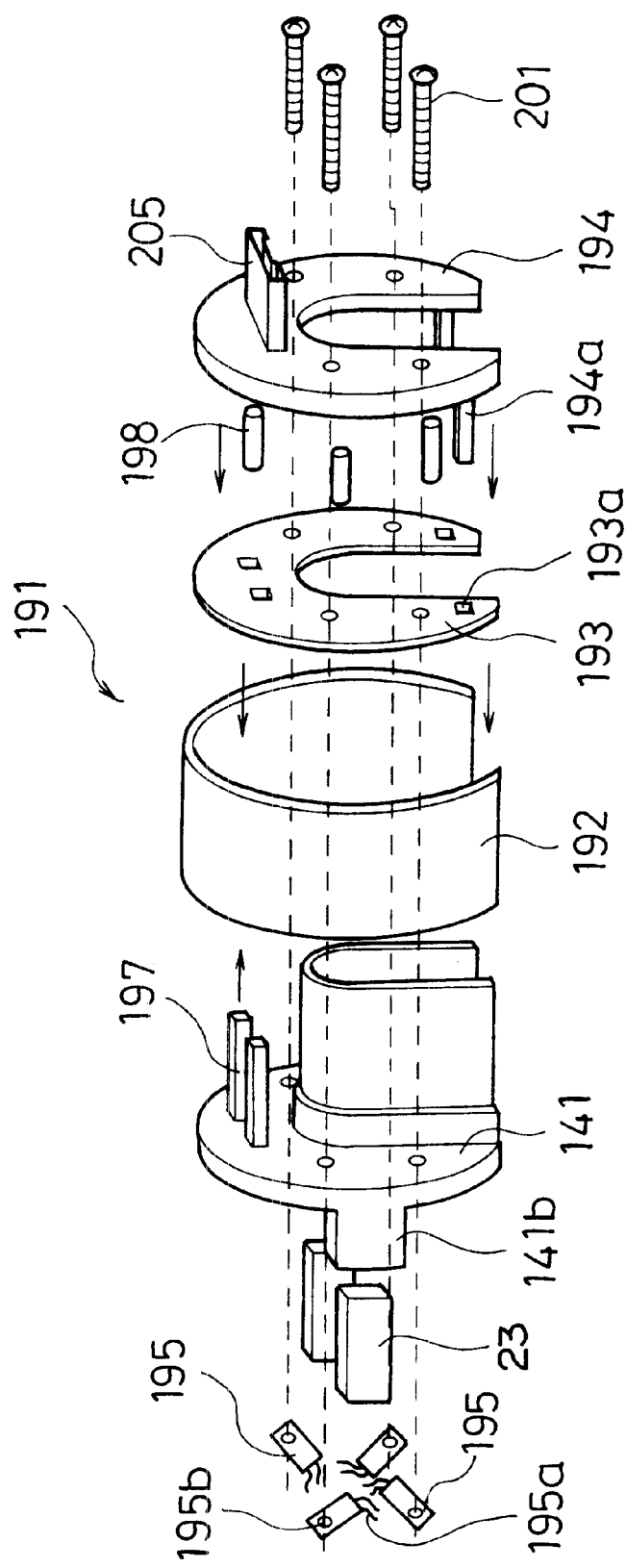
FIG. 7 is an exploded perspective view showing the structure of a driver unit.
Figure 9:
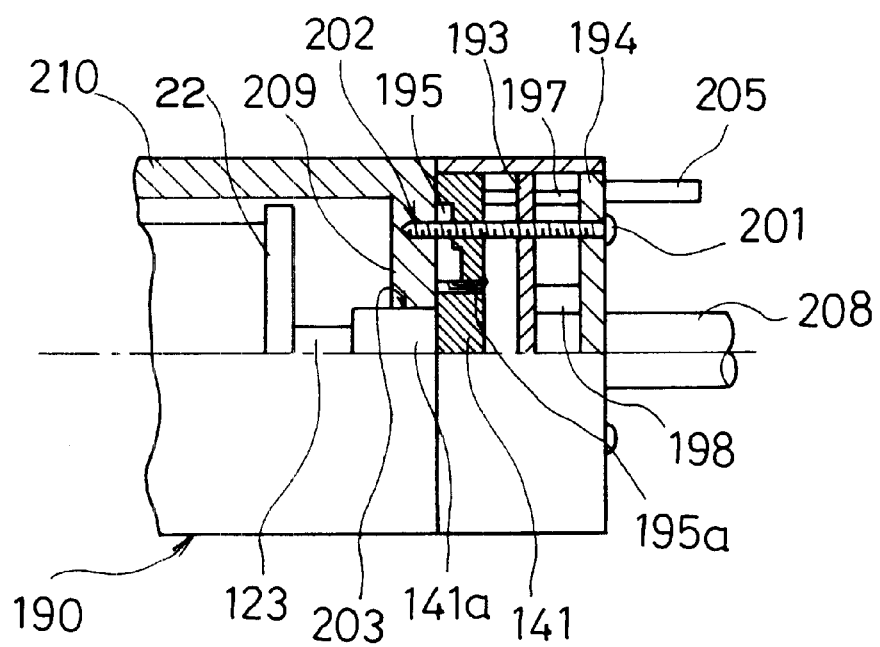
FIG. 9 is an explanatory view illustrating a state where a driver unit is attached to a yoke.

FIG. 6 is a view explaining the structure of an electric motor which is the third embodiment of the present invention. The electric motor according to the present invention is constructed from integrating control drive elements (control drive means) such as FETs and ECUs and various circuit elements with a brush holder to form a driver unit (control drive unit) 191 and from providing and fixing this unit outside a yoke 210. FIG. 7 is an exploded perspective view showing the structure of the driver unit 191, and FIG. 9 is a perspective view shown from the opposite direction of FIG. 6. FIG. 9 is a view explaining a state where the driver unit 191 is installed to the yoke 210.

As shown in FIG. 6, the driver unit 191 according to the present embodiment is attached to an outer end surface of the yoke 210. Since a drive shaft 208 of the electric motor 190 projects from the yoke 210, the driver unit 191 is formed into a hoof-like shape in case-of this electric motor 190, and the driver unit 191 is attached so as to stride over the drive shaft 208 at a concave portion 191a of the unit 191. Note that the driver unit 191 is not limited to the hoof-like shape but may be a donut-like shape as long as it can be attached. Otherwise, if there is not an obstacle such as a drive shaft 208 or the like, the driver unit 191 may be formed into a cylindrical or box-like shape.

As shown in FIG. 7, the driver unit 191 is constructed from integrally containing a brush holder 141, a print wire board (hereinafter abbreviated as PWB) 193, an insert wiring board (hereinafter abbreviated as IWB) 194, and FETs 195 as a control drive element, in a case 192. That is, the drive unit 191 is constructed from integrally arranging the brush holder 141 and the driver of the control system. Accordingly, as described previously, wiring between the control device and the electric motor can be omitted from the electric motor 190, so noise reduction and efficient improvement of the system can be achieved.

The brush holder 141 contains brushes 23 which are connected to terminals 197 through a not shown connecting line provided in the brush holder 141. Each end portion of the terminal 197 is welded to the IWB 194, thereby connecting the brush 23 with the IWB 194. The PWB 193 equips circuit elements such as resistors and the like, and connection terminals 194a of the IWB 194 are inserted in and soldered to connection holes 193a of the IWB 194. In this manner, the PWB 193 and the IWB 194 are electrically connected with each other and both are assembled as a unit. Note that spacers 198 are provided between the PWB 193 and the IWB 194.

Figure 8:
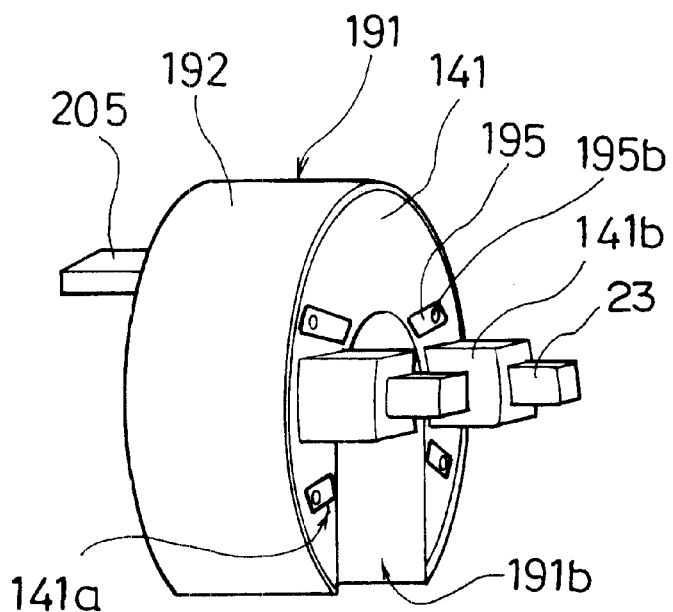
FIG. 8 is a perspective view showing a driver viewed from the opposite direction of FIG. 6.

In the left surface side of the brush holder 141 in FIG. 7, FETs 195 are attached as clearly shown in FIG. 8. The brush holder 141 has four FET container portions 141a and the FETs 195 are attached thereto. The FET 195 is attached so that one surface thereof is exposed from the end surface of the brush holder 141. Terminals 195a of the FET 195 are led from the FET container portions 141a to the PWB 193 side, respectively and are extended to the back surface side of the brush holder 141, thereafter being soldered. The IWB 194 is provided with a coupler 205 for power supply and control signal transmission/reception. The coupler 205 may be a male or female type.

After the brush holder 141. PWB 193, IWB 194, and FETs 195 are contained in the case 192, synthetic resin is filled inside to achieve potting. In this manner, the durability of the driver unit 191 is guaranteed, and as described previously, the driver unit 191 can be protected against impacts caused by stepping stones and the like even when the electric motor 190 is used in a power steering apparatus located near the vehicle-driving surface.

The driver unit 191 having the structure described above is provided and fixed outside an end portion of the yoke 210 as shown in FIGS. 6 and 9. An end side of the yoke 210 is closed by a side wall 209, and the driver unit 191 is attached so that the exposed surface of the FET 195 abuts on the outer surface of the side wall 209. The driver unit 191 is fixed by screws 201 through installation holes 195b of the FETs 195. As shown in FIG. 7, the brush holder 141, PWB 193, and IWB 194 are provided with insertion holes at positions respectively corresponding to the installation holes 195b. The screws 201 are screwed into female screw holes 202 provided in the side wall 209 through those insertion holes. That is, the driver unit 191 is fixed to the side wall 209 with the FETs 195 tightened together. Note that the number of the FETs 195 is not limited to four and all the FETs need not always be tightened together for fixing. In case where the number of the FETs is increased to eight, for example, four FETs 195 of eight may remain not tightened together.

Thus, in the electric motor 190, the driver unit 191 is attached with the surfaces of the FETs 95 which are kept in tight contact with the side wall 209. Accordingly, heat generated from the FETs 195 is radiated through the yoke 210 which has excellent thermal conductivity, so the heat radiation capability can be ensured. Note that an FET press plate made of aluminum may be provided on the end surface of the brush holder 141 and the FETs may be contained therein.

Meanwhile, two opening portions 203 are provided so as to correspond to the brushes 23. The opening portions 203 are formed to be slightly larger than the projection portions 141b of the brush holder 141 so that the advance angle which will be described later can be adjusted easily. Further, the brushes 23 are inserted into the yoke 210 through the opening portions 203 and are pressed in the axial direction by a not shown elastic member slidably contacted with the commutator 22. Also in this electric motor 190, a so-called disk-type commutator is used as the commutator 22, and the brushes 23 slidably contacts the right end surface of the commutator from the axial direction. An O-ring 107 is inserted between the driver unit 191 and each of the opening portions 203, and the areas of the opening portions 203 are sealed to be watertight.

The electric motor 190 is assembled as follows. Firstly, an assembled driver unit 191 is attached to stride over the drive shaft 208 at the right end of the yoke 210 in FIG. 6. The brushes 23 are inserted in the opening portions 203. Next, the driver unit 191 is fixed by screws 201. The exposed surfaces of the FETs 195 abut on the outer surface of the side wall 209 of the yoke 210, and the FETs 195 are tightened together with the screws 201 and fixed tightly to the side wall 209. In the electric motor 190, the brush holder 141 and the control drive system are integrated as a sub-unit, so the structure including a power supply system and a signal system can be assembled by only work for securing the driver unit 191 to the yoke 210 by screws.

Thereafter, an armature, a field magnetic device, and the like are inserted in the yoke 210 and the assembly of the electric motor 190 is thereby completed. In this electric motor 190, the advance angle can thereafter be adjusted by using play between the opening portions 203 and the brush holder 141. If the installation positions of the brushes are shifted in relation to the magnets fixed in the yoke 210, there is a case that the rotation characteristic differs in the rotating direction. If such a characteristic difference appears, there are possibilities as follows. That is, for example, when the electric motor 190 is used in the power steering apparatus for a vehicle, assist force of a steering handle differs in the steering direction thereof and load of the steering handle differs in the rotating direction thereof. However, optimal setting positions can be easily selected by fixing the characteristic as the brushes 23 are inserted and the characteristic is appropriately measured.

Thus, in the electric motor 190, the driver unit 191 which integrates the control means with the brush holder outside the closed end surface like the side wall 209 is attached, and opening portions are provided in the side wall 209. In this manner, power supply is achieved. Therefore, even if the power supply section of the electric motor is not situated near an opening portion, the brush and the control means can be assembled easily. So, the assembling operation is greatly improved, limitations to the assembly are eliminated, and degree of freedom in design is enhanced. Also, since the brushes 23 are provided in the external driver unit 191, the brushes can be easily replaced.

Embodiment 4

Figure 10:
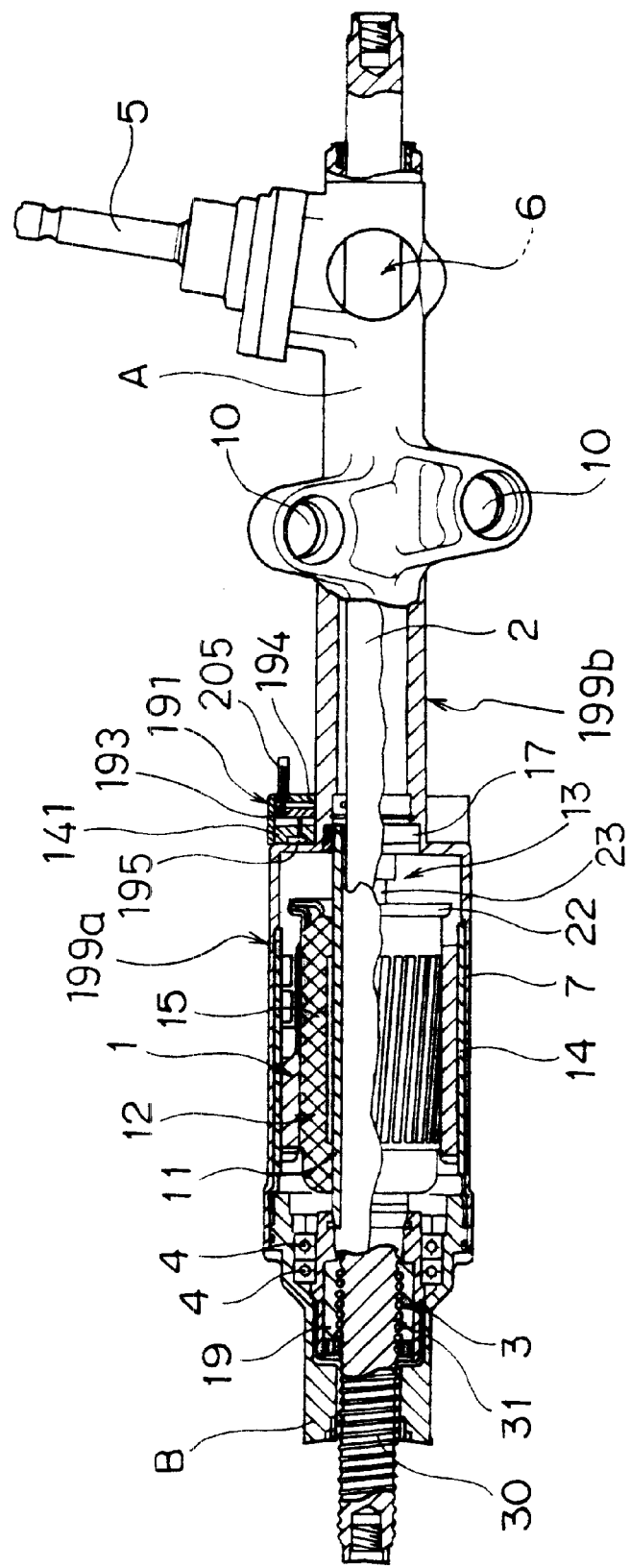
FIG. 10 is an explanatory view illustrating the entire structure of an electric power steering apparatus which is the embodiment 4 of the present invention, including a partial section.

Explained next will be a power steering apparatus as the embodiment 4 to which the present invention is applied. FIG. 10 shows the entire structure of this power steering apparatus including a partial cross-section thereof. Note that the same members and components as those of the electric motor 190 according to the embodiment 3 will be denoted at the same reference symbols and detailed explanation thereof will be omitted herefrom.

As shown in FIG. 10, the power steering apparatus has substantially the same structure as that of the power steering apparatus shown in FIG. 4. Note that explanation will be omitted with respect to portions similar to those of the apparatus shown in FIG. 4.

Figure 11:
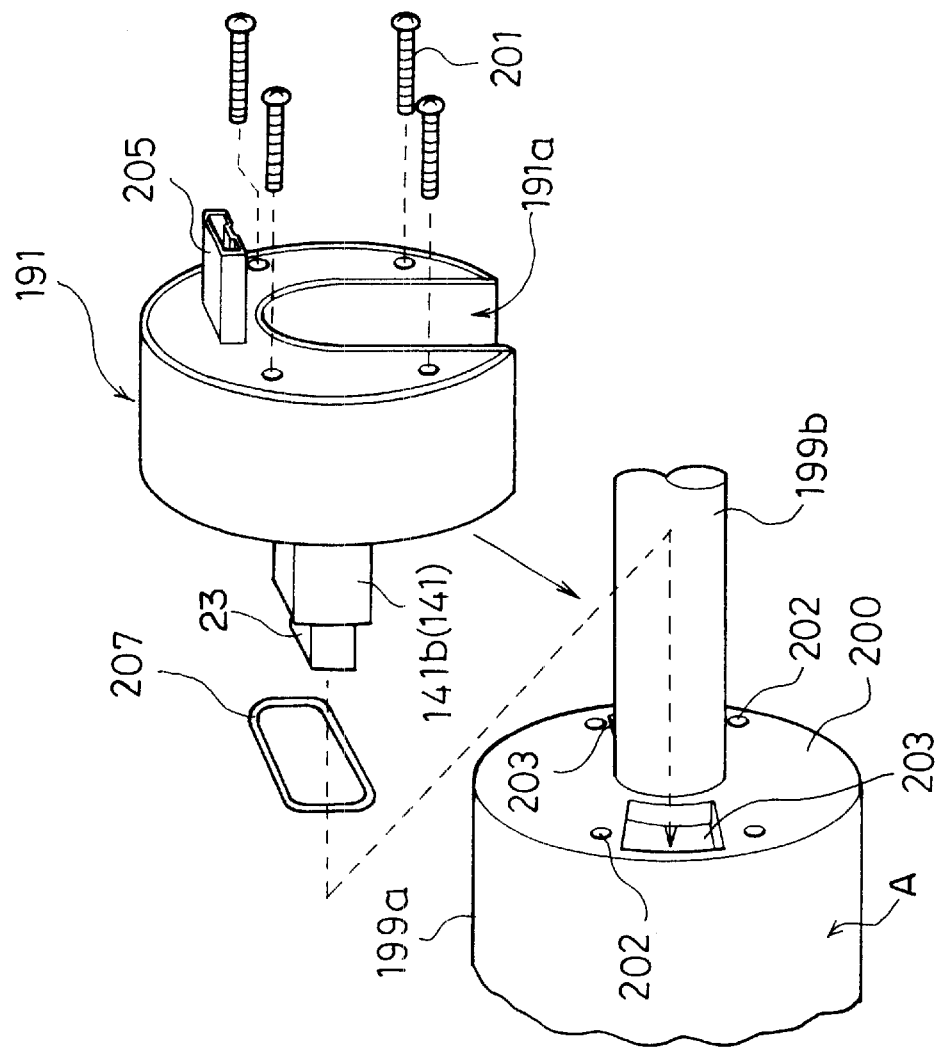
FIG. 11 is an explanatory view illustrating an installation state of a driver unit in an electric power steering apparatus which is the embodiment 5 of the present invention.

In the power steering apparatus according to the embodiment 4, the driver unit 191 for controlling and driving the electric motor 1 is attached outside the housing A of the power supply section 13. That is, the brush holder 141 and the control drive means are integrated into a unit and are installed externally on the power steering apparatus. FIG. 11 is a view showing an installation state where the driver unit 191 is installed.

The driver unit 191 has the same structure as that shown in FIG. 7. As shown in FIG. 11, the driver unit 191 is located and fixed at an end portion of a large diameter portion 199a of the housing A. The driver unit 191 is attached so as to stride over a small diameter portion 199b through a concave portion 191a of the unit from the right side of the housing A in FIGS. 10 and 11. As shown in FIG. 11, one end side of the large diameter portion 199a is closed by the side wall 200, and the driver unit 191 is attached so that the exposed surface of the FET 195 abuts on the outer surface of the side wall 200. Opening portions 203 are provided in the side wall 200, and brushes 23 are inserted therein. Installation holes 195b of FETs 195 are fixed by screws 201 at the driver unit 191. These statuses are the same as those shown in FIG. 9 except that the yoke 7 and the side wall 209 respectively correspond to the housing A and the side wall 200.

Accordingly, in the present power steering apparatus, heat generated from the FETs 195 is rapidly radiated through the ho using A which has excellent heat conductivity like the electric motor 190 described previously, so the heat radiation characteristic of the driver unit 91 is ensured. Also, the control drive section can be integrally formed at the power steering apparatus through simple work, by using the driver unit 191. Further, wiring to the electric motor can be omitted and the structures of the control system and the power supply system can be simplified, so that noise reduction and efficient improvement of the system can be achieved.

The housing A of the power steering apparatus shown in FIG. 10 is assembled as follows. Like the electric motor 190 described previously, an assembled driver unit 191 is attached on the outer surface of the side wall 200 of the housing A. The brushes 23 and the projecting portions 141a of the brush holder 141 are inserted in the opening portions 203. Next, the driver unit 191 is fixed by screws 201. The FETs 195 are tightened together by screws 201 and fixed in tight contact with the side wall 200. Thus, in this power steering apparatus, the power system and the signal system can be constructed by only work for securing the driver unit 191.

Thereafter, an armature, a field magnetic device 12, and the like are inserted in the housing A, and assembly of the part of the electric motor 1 is thereby completed. Note that the yoke 7 has already been cast into the housing A. Also, like in the previous case, the advance angle can thereafter be adjusted. Thus, in the present power steering apparatus, even if the power supply section of the electric motor is not situated in the opening end side of the housing A, the control drive section can be easily and integrally formed. So, the assembling operation is greatly improved and limitations to the assembly are eliminated. Accordingly, degree of freedom in design is enhanced.

Embodiment 5

Figure 12:
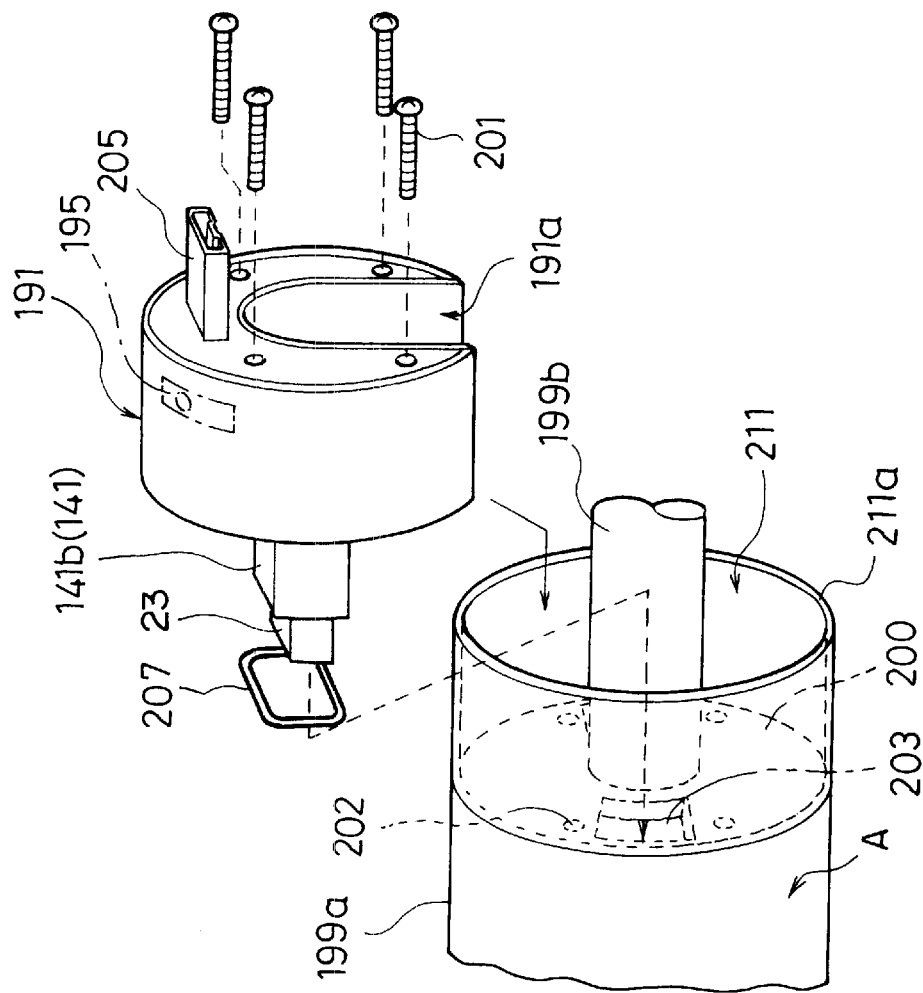
FIG. 12 is an explanatory view illustrating an stallation state of an electric power steering apparatus which is the embodiment 6 of the present invention.

Further, a power steering apparatus having a different installation form of the driver unit 191 will be explained as the embodiment 5. FIG. 12 is a view explaining schematically the structure of the embodiment. Note that the structure except the installation portion of the driver unit 191 are the same as that of the power steering apparatus according to the embodiment 4. Therefore, only main parts will be explained while explanation and illustration about common portions will be omitted herefrom. Also, the same members and components as those of the previous embodiment will be denoted at the same reference symbols and detailed explanation thereof will be omitted herefrom.

In the power steering apparatus according to the embodiment 5, a hollow driver unit container portion 211 is formed at an end portion of the housing A. The driver unit container portion 211 is formed to be integral with the housing A, and a side wall 200 is provided deep in this portion 211. Like the embodiment 4, two opening portions 203 are provided in the side wall 200.

The driver unit 191 is installed in the driver unit container portion 211. Brushes 23 are inserted in the opening portions 203, and FETs 195 are made in contact with the side wall 200 and are fixed by screws 201, as previously described. Thus, in the power steering apparatus shown in FIG. 12, the driver unit 191 is contained in the peripheral wall 211a of the driver unit container portion 211. Accordingly, in this structure, the peripheral wall 211a exists around the driver unit 191, so the driver unit 191 installed near the vehicle-driving surface can be protected against impacts caused by stepping stones.

In the present embodiment, FETs 195 shown by a broken line in FIG. 12 may be provided on the outer circumference of the driver unit 191 and may be exposed from the outer surface so as to contact the peripheral wall 211a. In this structure, heat can then be radiated therefrom.

Embodiment 6

Figure 13:
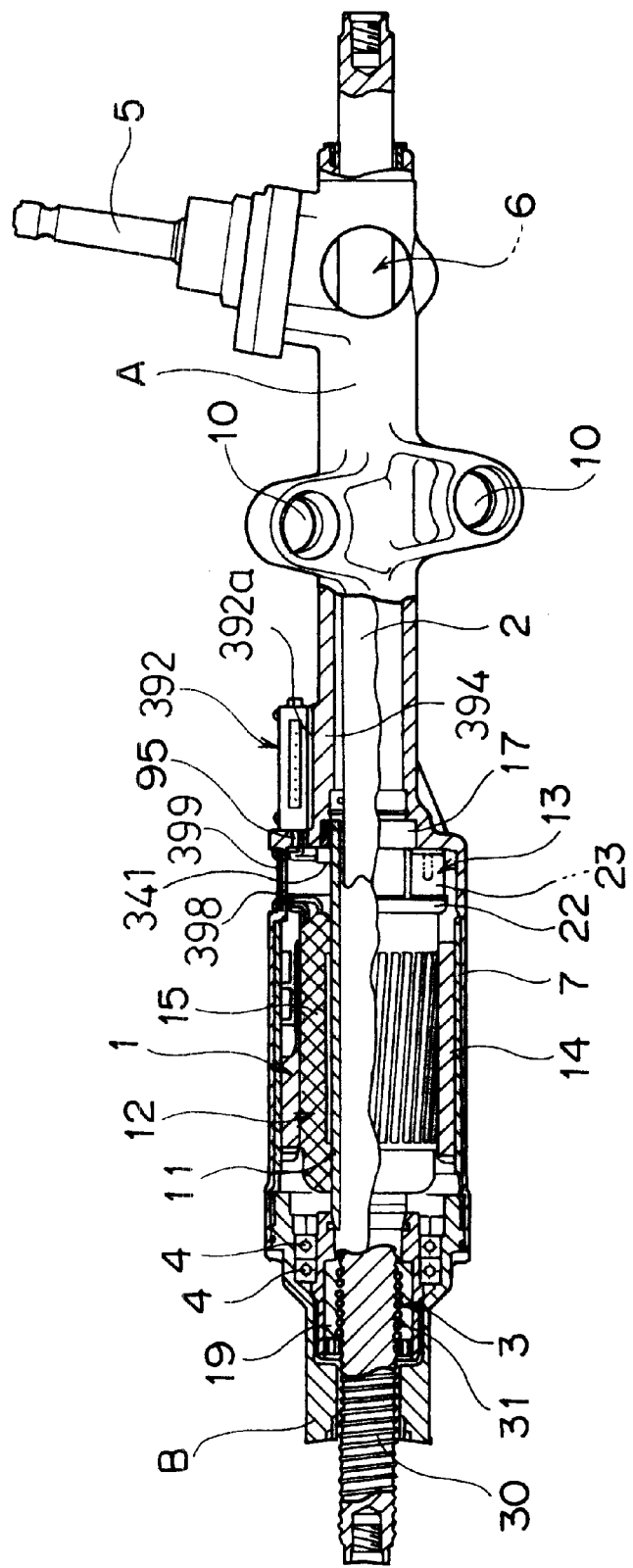
FIG. 13 is an explanatory view illustrating the entire structure of an electric power steering apparatus which is the embodiment 6 of the present invention, and including a partial section.

Further, the embodiment 6 of the present invention will be explained below. FIG. 13 shows the entire structure of the power steering apparatus as the embodiment 6 of the present invention, including a partial cross-section thereof. The power steering apparatus shown in FIG. 13 has a basic structure common to the power steering apparatus shown in FIG. 4. Also, in. this embodiment, explanation of the portions similar to those of the apparatus of FIG. 4 will be omitted.

The apparatus shown in FIG. 13 also uses a disk-type commutator 22. This is because as the present power steering apparatus is constructed from assembling the brushes 23 deep in the housing A, it is difficult to assemble such brushes that slidably make contact from the radial direction. The brushes 23 are held in a brush holder 341 made of synthetic resin and are pressed against the commutator 22 by an elastic member not shown. The brush holder 341 is provided with terminals 391 electrically connected with the brushes 23.

Figure 14:
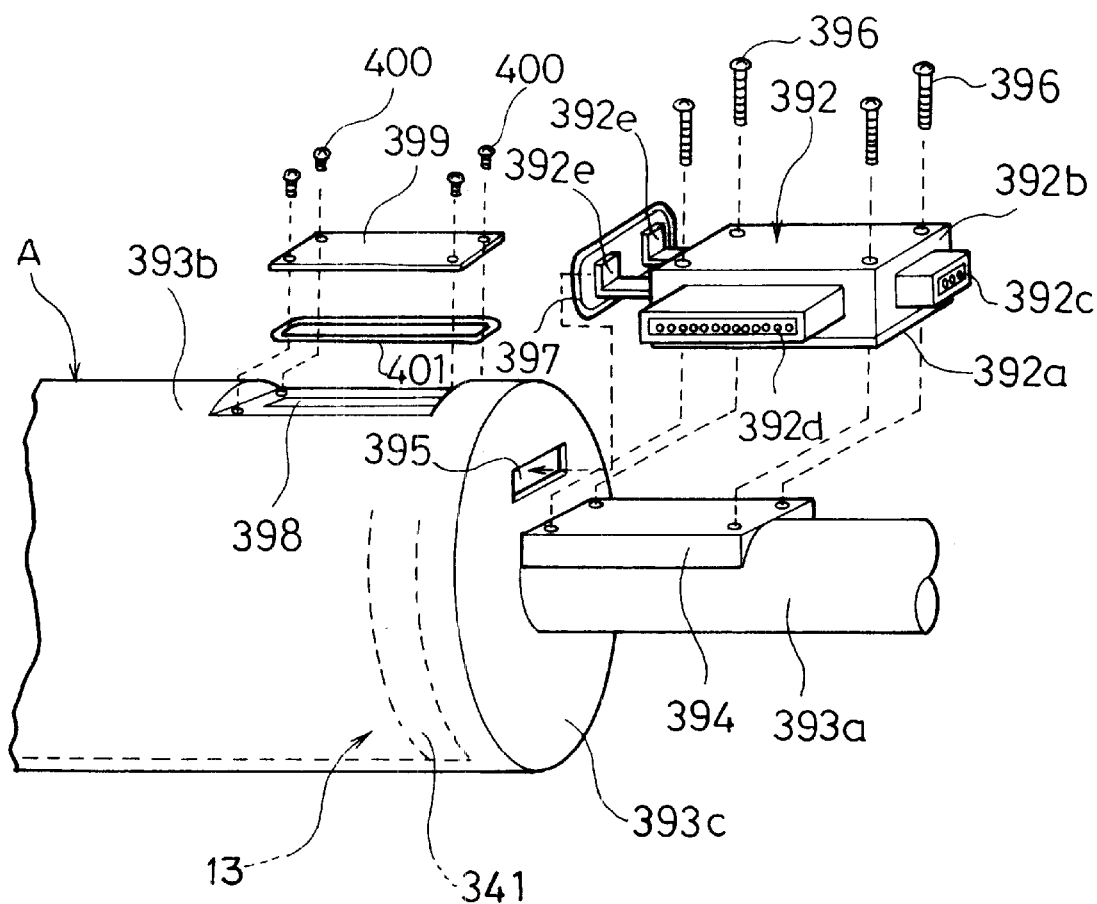
FIG. 14 is an explanatory view illustrating an installation state of a driver unit.
Figure 15:
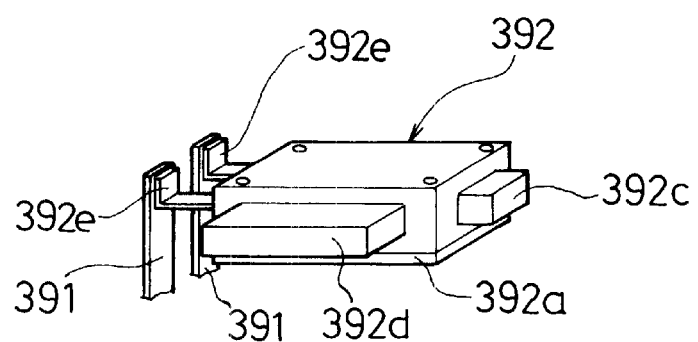
FIG. 15 is an explanatory view illustrating the relationship between a terminal plate of a driver unit and a contact plate of a brush holder.

Meanwhile, a driver unit (control drive means) 392 for controlling and driving the electric motor 1 is attached near a power supply section 13 so as to be integrated with the housing A. FIGS. 14 and 15 are views explaining installation statuses of the driver unit 392.

The driver unit 392 is constructed from providing elements such as FETs on a heat radiation plate 392a made of metal and from covering the elements with a case 392b made of synthetic resin after subjecting the elements to potting. The FETs and ECUs are subjected to potting and then contained into the case 392b because the durability of the driver unit 392 is also taken into consideration. Therefore, even in case where this unit is attached to the power steering apparatus located near the vehicle-driving surface, it is possible to prevent damages due to stepping stones and the like.

The driver unit 392 is provided with a power source coupler 392c and a signal line coupler 392d and those coupler 392c and 392d are connected to another electric equipment system not shown. These couplers 392c and 392d may be male or female types. Terminal plates 392e are led from the driver unit 392 for supplying a power source to the electric motor 1.

Next, a seat 394 for mounting the driver unit 392 is integrally formed with a small diameter portion 393a of the housing A. A power supply opening portion 395 which communicates with the inside of the housing A is provided in an end surface 393c of the large diameter portion 393b in the housing A. In this manner, as shown in FIG. 14, after the terminal plates 392c are inserted in the power supply opening portion 395, the driver unit 392 is fixed onto the seat 394 by screws 396 with the terminal plates 392e. The heat radiation plate 392a of the driver unit 392 is directly mounted on the seat 394. Therefore, also in the power steering apparatus shown in FIG. 13, heat generated from the FETs and the like is radiated rapidly, so the heat radiation characteristic of the driver unit 392 can be ensured. Accordingly, the driver unit 392 can be constructed without providing any other heat radiation portion, so the size of the unit can be minimized. Therefore, the driver unit 392 can be installed within the size of the large diameter portion 393b of the housing A without interfering with other components. Since the driver unit 392 can be attached to the outside of the housing A, the driver unit 392 can be protected from dust caused by abrasion of the brushes.

As shown in FIG. 15, the terminal plates 392e inserted in the housing A through the power supply opening portion 395 face terminals 391 of the brushes 23 with each other, respectively. By connecting these components, the driver unit 392 and the electric motor 1 are electrically connected to each other. That is, wiring between the control device and the motor can be omitted so that noise reduction and efficient improvement of the system can be achieved. An O-ring 397 is inserted between the power supply opening portion 395 and the driver unit 392, and the opening portion 395 is sealed to be watertight.

Meanwhile, a second opening portion 398 is provided at the large diameter portion 393b so as to face the power supply section 13 of the electric motor 1. Slidable contact portions between the commutator 22 and the brushes 23 can be observed from the second opening portion 398. Accordingly, condition of the power supply section 13 can be ascertained by eyes through the second opening portion 398 and maintenance can be performed with ease. Also, the terminal plates 392e and terminals 391 arranged as shown in FIG. 15 can be observed from the second opening portion 398. Therefore, spot welding can be performed between the terminal plates 392e and the terminals 391 with use of the second opening portion 398, and this work can be carried out even after the electric motor 1 is assembled.

A cover 399 is attached to the second opening portion 398. The cover 399 is attached by screws 400 and an O-ring 401 is inserted between the housing A and the cover 399.

Figure 16:
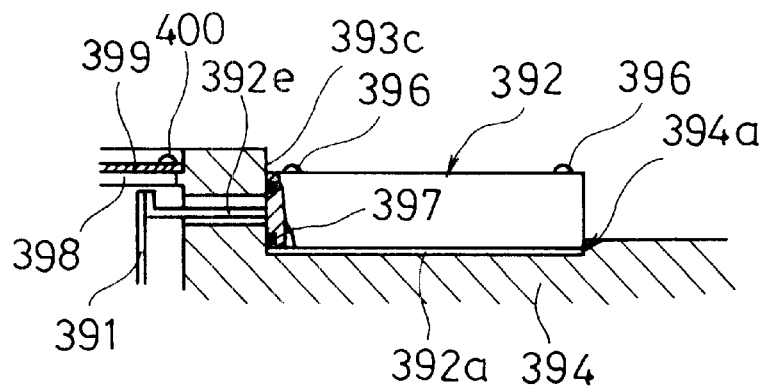
FIG. 16(a) is an explanatory view illustrating installation states of a driver unit.
FIG. 16(b) is an explanatory view illustrating installation states of a driver unit.
FIG. 16(c) is an explanatory view illustrating installation states of a driver unit.
Figure 16:
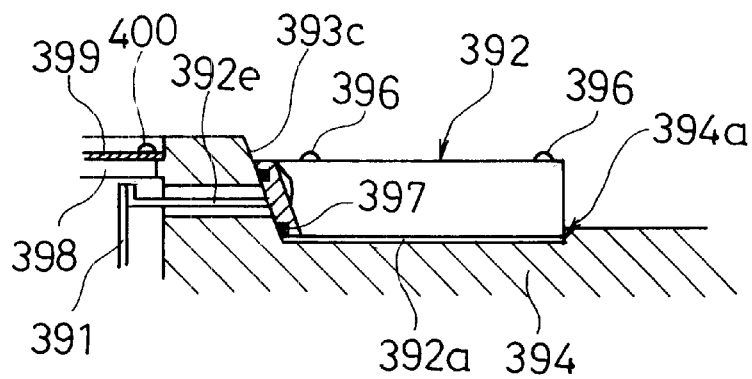
Figure 16:
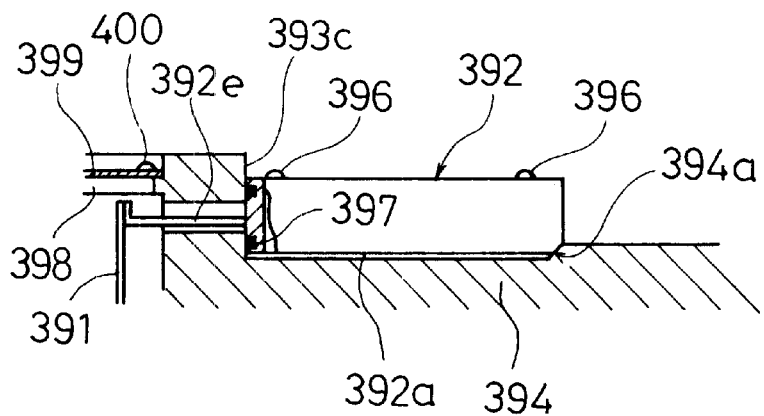

When attaching the driver unit 392 onto the seat 394, the driver unit 392 may be limited in the axial direction thereof and its end surface may be pressed against the end surface 393c of the housing A in order to improve the sealing characteristic obtained by the O-ring 397. FIGS. 16(a) to (c) is a view explaining this state. In FIG. 16(a), a step portion 394a is provided on the seat 394, and the driver unit 392 is limited between the step portion 394a and the end surface 393c. In FIG. 16(b), a step portion 394a is formed and the end surface 393 is tapered to limit the driver unit 392. In FIG. 16(c), the step portion 394a is tapered.

Embodiment 7

Figure 17:
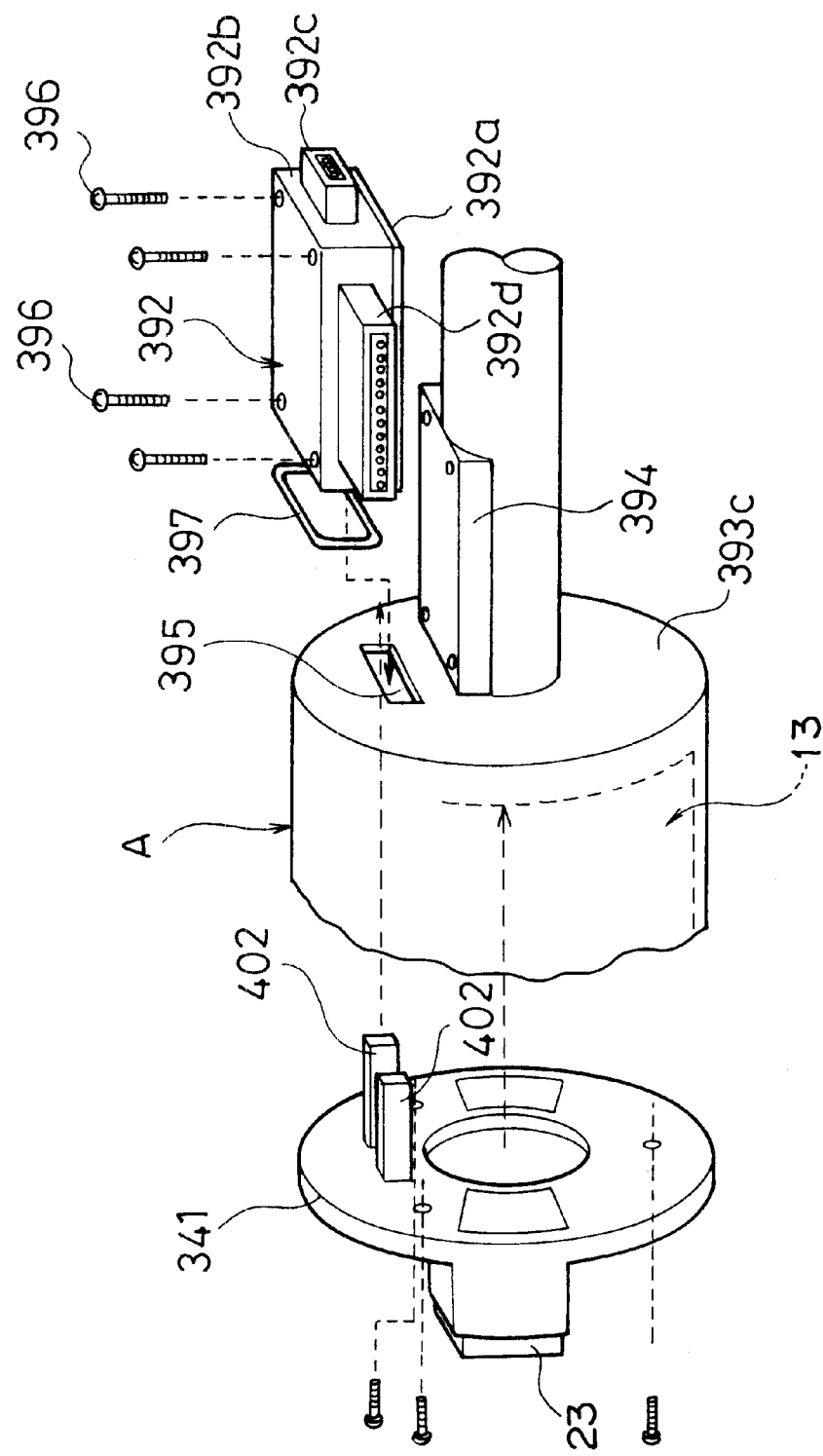
FIG. 17 is an explanatory view illustrating an installation state of a driver unit in an electric power steering apparatus which is the embodiment 7 of the present invention.

Additionally, as the embodiment 7, explanation will be made of a structure in which the brush holder 341 and the driver unit 392 can be inserted into and engaged with each other. FIG. 17 is a view explaining an installation state of the driver unit 392 in the power steering apparatus which is the embodiment 7 of the present invention. The same members and components as those of the embodiment 6 will be denoted at the same reference symbols and explanation thereof will be omitted herefrom.

As shown in FIG. 17, in the embodiment 7, male terminals 402 electrically connected to brushes 23 are formed in the back surface side of the brush holder 341 (on the opposite surface of the brushes 23). When the brush holder 341 is attained into the housing A, the male terminals 402 are inserted into the power supply opening portion 395, and are outwardly projected from the housing A. Meanwhile, female terminals not shown which should be engaged with the male terminals 402 are formed in a side of the driver unit 392. The driver unit 392 is fixed on a seat 394 with the female terminals engaged with the male terminals 402.

FIGS. 18(a) and (b) show a modified example of the embodiment 7. In FIG. 18(a), a female coupler 403 is provided on the back surface of the brush holder 341, and male terminals 404 of the driver unit 392 are engaged therewith. The female coupler 403 may be formed to stay in the housing A or to be projected from the housing A. If this coupler is projected, a concave portion for receiving the female coupler 403 is required in the side of the driver unit 392.

In FIG. 18(b), a coupler holder 405 is formed on the surface of the brush holder 341 in the side of the brush 23, and a female coupler 406 connected to the brush 23 is contained in the holder 405. Socket holes 407 are formed in the back surface side of the brush holder 341 so as to correspond to the female coupler 406. Further, the male terminals 404 of the driver unit 392 are inserted into the socket holes 407 and engaged with the female coupler 406.

Figure 18:
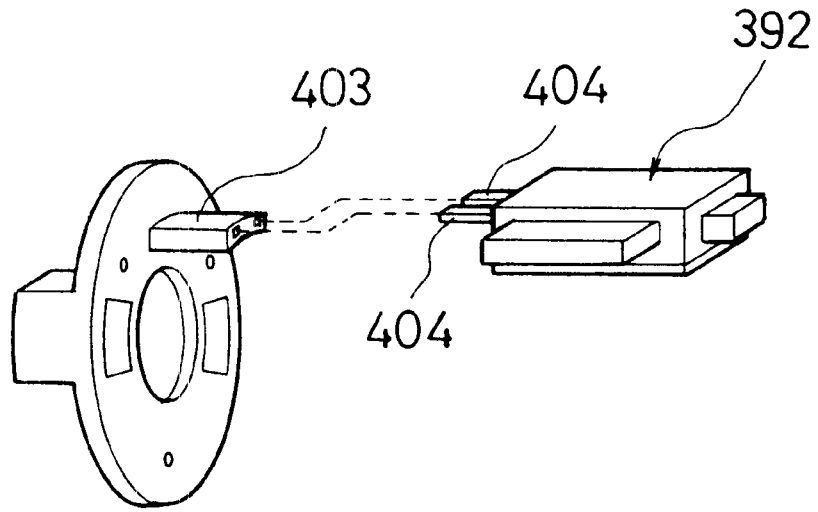
FIG. 18(a) is an explanatory view illustrating modification of the electric power steering apparatus of the embodiment 7.
FIG. 18(b) is an explanatory view illustrating modification of the electric power steering apparatus of the embodiment 7.
Figure 18:
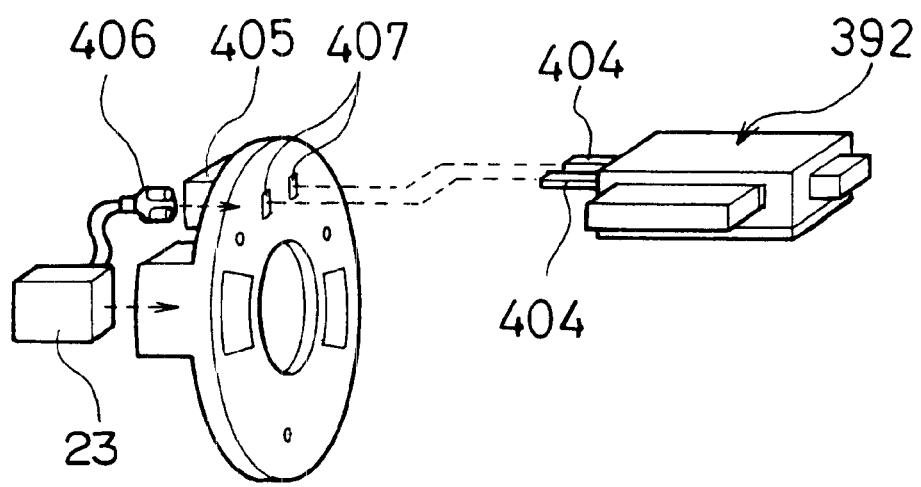
Figure 19:
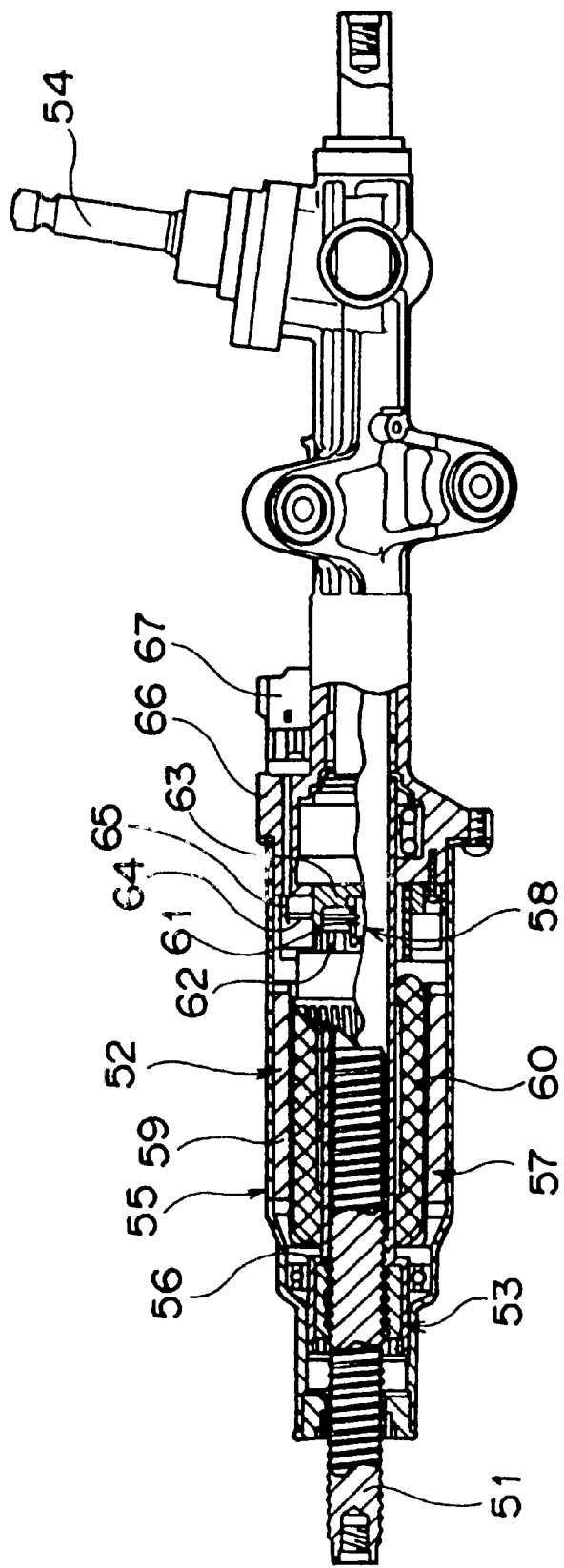
FIG. 19 is an explanatory view illustrating the entire structure of a conventional electric power steering apparatus, and including a partial section.

In cases of the structures shown in FIGS. 17 and 18, it is possible to attach the driver unit 392 without particularly providing a second opening portion 398 unlike the embodiment 6. However, a second opening portion may be optionally provided to observe the status of the power supply section 13.

The present invention is not limited to the embodiments described above but may be variously modified without departing from the subject matter of the invention.

For example, although the electric motor described above is a type which supplies power with use of brushes, the structure of containing the driver unit in the yoke or housing is applicable even to a brushless motor. Also, the embodiments described above shows electric motors in which a disk-type commutator is used and brushes make slidable contact in the axial direction of the commutator. However, the present invention is applicable to an electric motor of the type in which brushes move in the radial direction and make contact with a commutator in the radial direction.

Meanwhile, in the examples described above, the FETs are exposed from and provided with the driver unit. That is, one surface of each FET is in direct contact with the side wall of the driver unit. However, elements such as FETs and the like may be provided in a back side of a metal plate such as aluminum or copper which has excellent thermal conductivity, and a front surface side of the metal plate may be exposed in contact with the side wall. Also, elements such as FETs and the like may be provided on the outer circumferential surface of the driver unit and be brought into contact with the cylindrical portion of the housing to improve heat radiation.

Thus, according to the present invention, in an electric motor including a cylindrical yoke having a side wall at one end portion, even in case of an electric motor which is constructed from containing the driver unit in an end portion of the side wall inside the yoke, and locating a power supply section deep in the yoke, the control drive section can integrally be provided with the electric motor without hindering the assembling operation.

Also, in an electric motor including a cylindrical yoke having a side wall at one end portion, even in case of an electric motor which is constructed from integrally providing a brush holder and control drive means with each other, forming a driver unit, arranging the driver unit on an outer surface of the side wall in the yoke, and locating a power supply section deep in the yoke, the control drive section can integrally be provided with the election motor without hindering the assembling operation.

Further, since the driver unit is located inside or outside the yoke with the driver unit kept in direct contact with the side wall, heat generated from control drive elements such as FETs and the like can be efficiently radiated through the yoke. In addition, since the driver unit is constructed from containing a brush holder, the structure of the power supply section can be simplified.

Meanwhile, in an electric power steering apparatus with a power supply section provided deep in the housing, even in case of a type of electric power steering apparatus which is constructed from being contained in a position adjacent to the power supply section in the housing, the driver unit can be integrally arranged with the housing without hindering the assembling operation.

Also, in an electric power steering apparatus with a power supply section provided deep in the housing, even in case of a type of electric power steering apparatus which is constructed from integrally providing a brush holder and control drive means with each other, forming a drive control unit, and locating at portion which faces the power supply section outside the housing, the driver unit can be integrally arranged with the housing without hindering the assembling operation.

Further, a type of electric power steering apparatus is constructed from forming a power supply opening portion so as to face the power supply section of the electric motor in the housing, electrically connecting the power supply section of the electric motor to a driver unit through the power supply opening portion, integrally forming the driver unit with the housing, and containing the power supply section deep in the housing. Therefore, even in a case of this type of the electric power steering apparatus, the driver unit can be integrally arranged with the housing without hindering the assembling operation. As a result of this, the driver unit is provided outside the housing separately from the power supply section, and therefore, the driver unit can be protected from dust caused by abrasion of the brushes.

Meanwhile, a second opening portion through which the slidable contact portions of the commutator of the electric motor and the brushes can be observed is further formed at the housing so as to face the power supply section of the electric motor. Therefore, the state of slidable contact between the brushes and the commutator at the power supply section can be observed visually, so maintenance thereof are facilitated. Also, the terminal plates of the driver unit and the contact plates of the brushes can be welded with use of this second opening portion.

Further, since control drive elements of the driver unit are located on a heat radiation plate made of metal and the driver unit is attached onto the housing with the heat radiation plate kept in direct contact with the housing, the heat radiation characteristic of the driver unit can be guaranteed.

What is claimed is:

1. An electric power steering apparatus comprising:
    a rack shaft connected to steering wheels;
    a first housing having an axial direction and first and second ends for containing the rack shaft for movement in the axial direction, said first housing having a first portion where rack teeth formed on the rack shaft are engaged with a pinion of a steering shaft connected to a steering handle and a second portion, the first housing portion extending axially from the first end of the housing to a joining point and the second housing portion extending axially from the joining point to the second end of the housing;
    an electric motor located coaxially around the rack shaft in the second portion of the first housing for supplying a steering assist force to the rack shaft;
    a ball screw mechanism connecting a nut portion connected with a rotor shaft of the electric motor and a screw portion formed on the rack shaft with each other with a ball member inserted therebetween, and for transmitting rotary power of the electric motor as steering assist force to the rack shaft; and
    a second housing containing the ball screw mechanism and connected with the second end of the first housing,
    a power supply section of the electric motor being provided adjacent the first housing at a location spaced axially from the second end of the first housing, characterized in that a control drive means for controlling and driving the electric motor is provided adjacent the first housing at a position near to the power supply section of the electric motor.

2. An electric power steering apparatus according to claim 1, characterized in that the power supply section is contained in the first housing.

3. An electric power steering apparatus according to claim 2, characterized in that said first housing has an opening portion through which an inside and an outside of a side wall of the first housing communicate with each other, and
    the control drive means is located outside of the first housing and is electrically connected to the power supply section through the opening portion.

4. An electric power steering apparatus according to claim 2, characterized in that the control drive means is located outside of the first housing in direct contact with a side wall of the first housing.

5. An electric power steering apparatus according to claim 1, characterized in that electric power is supplied to the electric motor by a brush, and
    a brush holder for containing the brush is an integral part of the control drive means.

6. An electric power steering apparatus according to claim 1, characterized in that a brush holder for containing a brush of the electric motor and the control drive means for controlling and driving the electric motor are integrated to form a drive control unit, and
    the drive control unit is located so as to face the power supply section.

7. An electric power steering apparatus according to claim 6, characterized in that an opening portion is formed in a side wall of the first housing through which an inside and an outside of the first housing communicate with each other, and
    a brush is insertable into the brush holder through the opening portion.

8. An electric power steering apparatus according to claim 6, characterized in that the drive control unit is provided outside of the first housing so as to directly contact a side wall of the first housing.

9. An electric power steering apparatus comprising:
    a rack shaft connected to steering wheels;
    a first housing having an axial direction and first and second ends for containing the rack shaft for movement in the axial direction, said first housing having a first portion where rack teeth formed on the rack shaft are engaged with a pinion of a steering shaft connected to a steering handle and a second portion, the first housing portion extending axially from the first end of the housing to a joining point and the second housing portion extending axially from the joining point to the second end of the housing;
    an electric motor located coaxially around the rack shaft in the second portion of the first housing for supplying a steering assist force to the rack shaft;
    a ball screw mechanism connecting a nut portion connected with a rotor shaft of the electric motor and a screw portion formed on the rack shaft with each other with a ball member inserted therebetween, and for transmitting rotary power of the electric motor as steering assist force to the rack shaft; and
    a second housing containing the ball screw mechanism, characterized in that the first housing has a power supply opening portion which is located so as to face a power supply section of the electric motor and to communicate with an inside and an outside of the first housing, and
    a control drive means for controlling and driving the electric motor is provided adjacent to and outside of the first housing and is electrically connected to the power supply section of the electric motor through the power supply opening portion.

10. An electric power steering apparatus according to claim 9, characterized in that the first housing further has a second opening portion, through which a slidable contact area between a commutator of the electric motor and a brush can be observed, said second opening portion being located so as to face the power supply section of the electric motor.

11. An electric power steering apparatus according to claim 9, characterized in that the control drive means includes a terminal plate which is inserted in the first housing through the power supply opening portion and can be observed through the second opening portion, and
    the terminal plate is welded, through the second opening portion, to a contact plate electrically connected to a brush of the electric motor.

12. An electric power steering apparatus according to claim 9, characterized in that the control drive means is constructed by providing, on a heat radiation plate made of metal, an element for controlling and driving the electric motor, and the control drive means is attached onto the first housing, with the heat radiation plate kept in direct contact with the first housing.

* * * * *